(12) United States Patent
Otsuki et al.

(10) Patent No.: US 10,147,005 B2
(45) Date of Patent: Dec. 4, 2018

(54) SIGN DISPLAY APPARATUS

(71) Applicant: HONDA MOTOR CO., LTD., Minato-ku, Tokyo (JP)

(72) Inventors: Masaru Otsuki, Utsunomiya (JP); Yutaka Tokunaga, Shioya-gun (JP); Izumi Takatsudo, Utsunomiya (JP); Shinnosuke Saito, Utsunomiya (JP); Yuji Yokochi, Utsunomiya (JP); Yasuhiko Fujita, Nasushiobara (JP)

(73) Assignee: Honda Motor Co., Ltd., Tokyo (JP)

( * ) Notice: Subject to any disclaimer, the term of this patent is extended or adjusted under 35 U.S.C. 154(b) by 58 days.

(21) Appl. No.: 14/340,699

(22) Filed: Jul. 25, 2014

(65) Prior Publication Data
US 2015/0035981 A1    Feb. 5, 2015

(30) Foreign Application Priority Data

Jul. 31, 2013 (JP) .................... 2013-158436
Aug. 9, 2013 (JP) .................... 2013-166668

(51) Int. Cl.
G06K 9/00 (2006.01)
B60R 1/00 (2006.01)
(Continued)

(52) U.S. Cl.
CPC ............ *G06K 9/00818* (2013.01); *B60R 1/00* (2013.01); *B60R 11/0229* (2013.01);
(Continued)

(58) Field of Classification Search
CPC .... B60R 2001/1215; B60R 2001/1253; B60R 1/04; B60R 2001/1284; B60R 2001/1223;
(Continued)

(56) References Cited

U.S. PATENT DOCUMENTS 4,962,366 A    10/1990    Hatanaka et al.
6,472,977 B1   10/2002    Pochmuller
(Continued)

FOREIGN PATENT DOCUMENTS

DE    10 2004 042 382 A1    3/2006
JP         62-061465 B2    12/1987
(Continued)

OTHER PUBLICATIONS

Office Action dated Nov. 10, 2015 issued over the corresponding Japanese Patent Application No. 2013-166668 with English translation of pertinent portion.
(Continued)

*Primary Examiner* — Jamie J Atala
*Assistant Examiner* — Ayman A Abaza
(74) *Attorney, Agent, or Firm* — Carrier Blackman & Associates, P.C.; Joseph P. Carrier; Jeffrey T. Gedeon

(57) ABSTRACT

A sign information output apparatus includes an output instructor for instructing an information output section to stop output of sign information if a traveled distance measured in response to the detection of a sign exceeds a threshold value, and a threshold value changer for changing a threshold value depending on at least one of interval information with respect to an interval at which signs of one type are placed, speed limit information with respect to a speed limit of the road, and a speed of the vehicle.

20 Claims, 23 Drawing Sheets

(51) Int. Cl.
  *B60R 11/02* (2006.01)
  *B60R 11/04* (2006.01)
  *H04N 7/18* (2006.01)
  *G08G 1/0962* (2006.01)

(52) U.S. Cl.
  CPC .......... *B60R 11/04* (2013.01); *G08G 1/09623* (2013.01); *H04N 7/183* (2013.01); *B60R 2300/00* (2013.01)

(58) Field of Classification Search
  CPC ................ B60R 11/04; G06K 9/00818; G08G 1/096716; G08G 1/096783; G08G 1/096758; G08G 1/09623; G08G 1/0967; G08G 1/09675
  USPC ........................................................ 348/148
  See application file for complete search history.

(56) References Cited

U.S. PATENT DOCUMENTS

| | | | |
|---|---|---|---|
| 6,801,638 B1* | 10/2004 | Janssen ................ | B60K 35/00 340/910 |
| 8,174,570 B2 | 5/2012 | Yoneyama et al. | |
| 2007/0290823 A1* | 12/2007 | Watanabe ............ | B60Q 1/2665 340/435 |
| 2008/0167800 A1* | 7/2008 | Geelen ............... | G01C 21/3655 701/533 |
| 2009/0074249 A1* | 3/2009 | Moed ................. | G06K 9/00818 382/104 |
| 2009/0224942 A1* | 9/2009 | Goudy ................. | G08G 1/164 340/905 |
| 2010/0245579 A1* | 9/2010 | Hongo ..................... | B60R 1/00 348/148 |
| 2012/0046855 A1* | 2/2012 | Wey .................... | G08G 1/09623 701/117 |
| 2012/0223845 A1* | 9/2012 | Schumann ............ | B60K 35/00 340/995.19 |
| 2014/0032072 A1* | 1/2014 | Yoshihama ............... | B60T 7/18 701/70 |

FOREIGN PATENT DOCUMENTS

| | | | | |
|---|---|---|---|---|
| JP | 63-055700 A | | 3/1988 | |
| JP | 06-168396 A | | 6/1994 | |
| JP | 06168392 A | * | 6/1994 | ............... G08G 1/09 |
| JP | 06168396 A | * | 6/1994 | |
| JP | 2001-191871 A | | 7/2001 | |
| JP | 2005-004410 A | | 1/2005 | |
| JP | 2008-185554 A | | 8/2008 | |
| JP | 2010-282278 A | | 12/2010 | |
| JP | 2012193965 A | | 10/2012 | |

OTHER PUBLICATIONS

Office Action dated Jul. 1, 2015 issued over the corresponding Japanese Patent Application No. 2013-166668 with the English translation of pertinent portion.
Office Action dated Jun. 2, 2015 issued over the corresponding Japanese Patent Application 2013-158436 with the English translation of the pertinent portion.
Partial European Search Report dated Mar. 13, 2015 issued in the corresponding European Patent Application No. 14178340.7.

\* cited by examiner

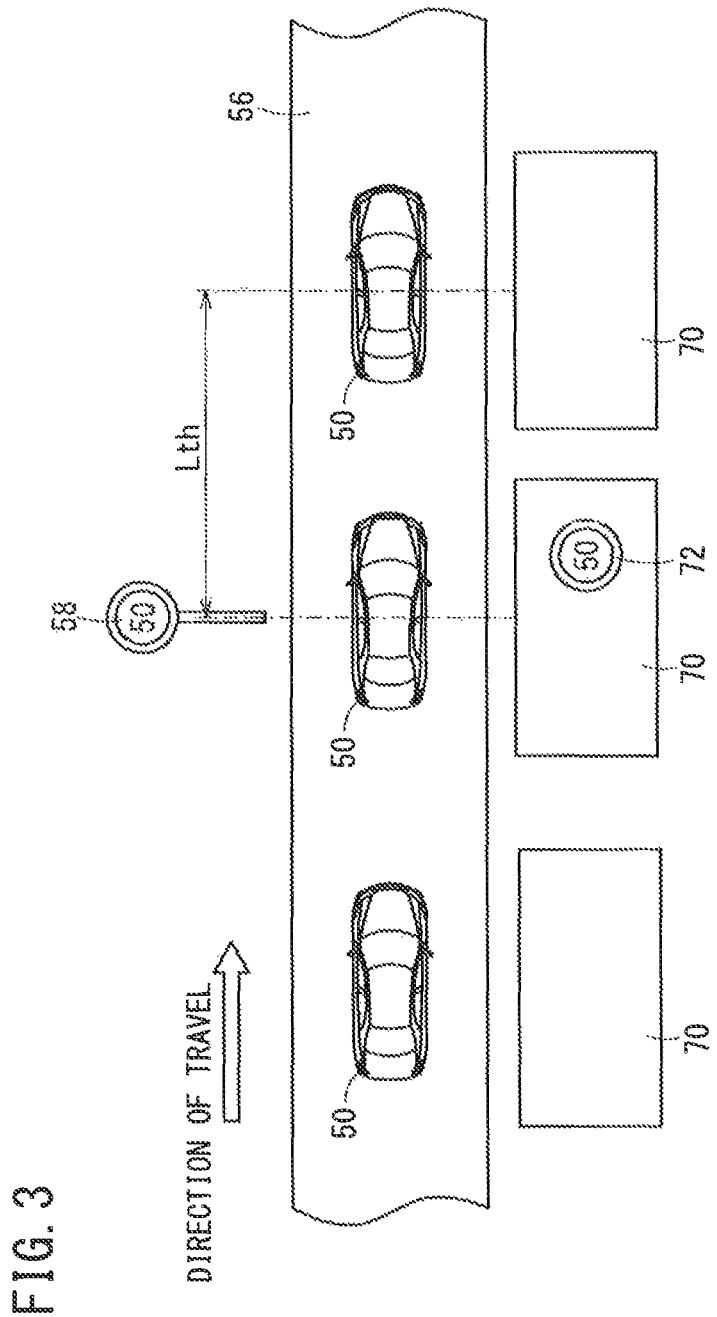

FIG. 6

| NAME | FIRST TABLE | SECOND TABLE | THIRD TABLE |
|---|---|---|---|
| SIGN VALUE | 0~40 | 70~ | 41~69 |
| ROAD TYPE | GENERAL ROAD | EXPRESSWAY | GENERAL ROAD (kph) / EXPRESSWAY (mph) |
| STORED VALUES  1 | 150 | 1000 | 250 |
| 2 | 150 | 1000 | 250 |
| 3 | 150 | 1000 | 250 |
| 4 | 150 | 1000 | 250 |
| 5 | 150 | 1000 | 250 |

42

SIGN DISPLAY APPARATUS

CROSS-REFERENCE TO RELATED APPLICATIONS

This application is based upon and claims the benefit of priority from Japanese Patent Applications No. 2013-158436 filed on Jul. 31, 2013, and No. 2013-166668 filed on Aug. 9, 2013, the contents all of which are incorporated herein by reference.

BACKGROUND OF THE INVENTION

Field of the Invention

The present invention relates to a sign information output apparatus for detecting a sign based on a captured image signal from an image capturing unit and outputting sign information representing the type of sign.

Description of the Related Art

Heretofore, there has been known a device for use on a vehicle, which detects a sign near a road based on an image signal from an image capturing unit, and outputs sign information representing the type of sign. Since this type of known device captures a sequence of images while the vehicle is being driven, the scene around the vehicle, which is represented in the captured images, may change at every moment. The device preferably performs a control process for causing the sign information output at the present time to fully follow the scene as it changes. Alternatively, the device may perform a control process such that previous content, which differs from sign information that exists in a scene at the present time, is not output as erroneous sign information.

For example, U.S. Patent Application Publication No. 2012/0046855 discloses a method of gradually decreasing the display intensity (representing an aging status) of sign information based on a travel state, including at least one of a traveled distance, an elapsed time, and a vehicle speed.

German Patent No. 102004042382 discloses a device for judging whether a vehicle is making a turn, and disabling display of sign information if an amount of steering or a radius of curvature of the turn exceeds a threshold value.

SUMMARY OF THE INVENTION

Road signs, which are placed along roads, are spaced at intervals that vary from area to area, particularly from country to country, due to legal requirements, geographical limitations, and various other factors including the living environment. According to the method disclosed in U.S. Patent Application Publication No. 2012/0046855, while the vehicle is being driven on a road with road signs spaced at large intervals, display of the sign information, which is currently being displayed, tends to disappear from the screen before the vehicle reaches the next road sign, thus making the driver of the vehicle feel uneasy concerning the way in which the sign information is displayed.

It is an object of the present invention to provide a signal information output device for use on a vehicle, which is capable of disabling an output of sign information at appropriate times, regardless of different areas in which the vehicle is being driven.

According to the present invention, there is provided a sign information output apparatus comprising an image capturing unit mounted on a vehicle for capturing an image and acquiring a captured image signal representing the captured image while the vehicle is being driven, a sign detector for detecting a sign on a peripheral edge of a road from an image area represented by the captured image signal acquired by the image capturing unit, an information output section for outputting sign information with respect to a type of sign that is detected by the sign detector, a traveled distance measurer for measuring a traveled distance over which the vehicle has traveled in response to detection of the sign, an output instructor for instructing the information output section to stop output of the sign information if the traveled distance measured by the traveled distance measurer exceeds a threshold value, and a threshold value changer for changing the threshold value depending on at least one of interval information with respect to an interval at which signs of one type are placed, speed limit information with respect to a speed limit of the road, and a speed of the vehicle.

As described above, the sign information output apparatus includes the output instructor for instructing the information output section to stop output of the sign information if the traveled distance, which is measured in response to detection of the sign, exceeds the threshold value, and the threshold value changer for changing the threshold value depending on at least one of the interval at which signs of one type are placed, the speed limit of the road, and the speed of the vehicle. Therefore, the sign information output apparatus is capable of establishing a maximum traveled distance, i.e., the threshold value, over which the sign information can be output continuously, in view of at least one of the interval at which the signs are placed, the speed limit of the road, and the speed of the vehicle. Therefore, it is possible to stop output of the sign information at an appropriate time, regardless of different areas in which the vehicle is driven.

Preferably, the traveled distance measurer measures the traveled distance from a most recently detected sign up to a next detected sign, which is of same type as the most recently detected sign, and the threshold value changer changes the threshold value depending on the traveled distance as the interval information. Inasmuch as the interval at which the signs are placed that is actually measured while the vehicle is being driven is taken into account, the timing for stopping output of the sign information is determined more appropriately.

Preferably, the sign information output apparatus further comprises a storage unit for successively storing measured traveled distances, and the threshold value changer changes the threshold value according to a learning process, which uses a plurality of most recently stored traveled distances stored in the storage unit as inputs, and uses the threshold value as an output. Therefore, an appropriate threshold value based on a most recently measured result can be obtained.

According to the present invention, there also is provided a sign information output apparatus comprising an image capturing unit mounted on a vehicle for capturing an image and acquiring a captured image signal representing the captured image while the vehicle is being driven, a sign detector for detecting a sign on a peripheral edge of a road from an image area represented by the captured image signal acquired by the image capturing unit, an information output section for outputting sign information with respect to a type of sign that is detected by the sign detector, a traveled distance measurer for measuring a traveled distance over which the vehicle has traveled in response to detection of the sign, an output instructor for instructing the information output section to stop output of the sign information if the traveled distance measured by the traveled distance measurer exceeds a threshold value, and a threshold value changer for changing the threshold value depending on a type of road. In view of the fact that, depending on the type of road, the interval at which signs are placed tends to differ, the timing for stopping output of the sign information is determined more appropriately.

Preferably, the sign detector detects whether the type of road indicates a general road or an expressway, based on a numerical value of a speed limit represented by the sign, and the threshold value changer changes the threshold value by selecting one of a first threshold value with respect to the general road and a second threshold value with respect to the expressway. Thus, the threshold value changer can select a threshold value, which is suitable for a general road or an expressway, based on the numerical value indicated by the sign, i.e., the speed limit.

Preferably, the threshold value changer changes the threshold value by selecting a third threshold value, which differs from the first threshold value and the second threshold value, if the sign detector is incapable of judging the type of road. If a different unit system is used for the speed limit, then the number indicated by the sign cannot always be judged as representing a speed limit for a general road or an expressway. When the third threshold value, which differs from the first threshold value and the second threshold value, is assigned, the threshold value changer is made compatible with various numerical ranges and various unit systems. Further, since only three threshold values need to be held, the amount of data stored in the storage unit can be reduced.

According to the present invention, there is further provided a sign information output apparatus comprising an image capturing unit mounted on a vehicle for capturing an image and acquiring a captured image signal representing the captured image while the vehicle is being driven, a sign detector for detecting a sign on a peripheral edge of a road from an image area represented by the captured image signal acquired by the image capturing unit, an information output section for outputting sign information with respect to a type of sign that is detected by the sign detector, a traveled distance measurer for measuring a traveled distance over which the vehicle has traveled in response to detection of the sign, an output instructor for instructing the information output section to stop output of the sign information if the traveled distance measured by the traveled distance measurer exceeds a threshold value, and a threshold value changer for changing the threshold value depending on the jurisdictional region of the road. Since the jurisdictional region in which the road exists is taken into account, the timing for stopping output of the sign information is determined more appropriately.

Preferably, the storage unit does not store the traveled distance if numerical values of speed limits represented by two adjacent signs differ from each other. Signs indicating different numerical values for the speed limit may be present together on the same road. In view of the fact that the signs indicative of the same numerical value are placed in a cyclic pattern, the processing accuracy of the learning process can be increased by precluding measured results that have different numerical values.

Preferably, the storage unit does not store the traveled distance if the vehicle changes a direction of travel while the traveled distance is being measured. Since it is highly possible that the vehicle may change lanes if the direction along which the vehicle travels changes, by precluding the measured result, the processing accuracy of the learning process can be increased.

According to the present invention, there also is provided a sign information output apparatus comprising an image capturing unit mounted on a vehicle for capturing an image and acquiring a captured image signal representing the captured image while the vehicle is being driven, a sign detector for detecting a sign from an image area represented by the captured image signal acquired by the image capturing unit, an information output section for outputting sign information with respect to a type of sign that is detected by the sign detector, a measured amount acquirer for acquiring a measured amount that is correlated to a behavior of the vehicle in transverse directions thereof, a starting time determiner for determining a starting time of a judgment process based on the measured amounts acquired by the measured amount acquirer, and an output instructor for instructing the information output section to stop output of the sign information if a time-dependent change of the measured amount from the starting time determined by the starting time determiner is judged to satisfy an output stop condition.

Since the sign information output apparatus has the measured amount acquirer for acquiring a measured amount that is correlated to a behavior of the vehicle in transverse directions thereof, the starting time determiner for determining a starting time of a judgment process based on the measured amounts acquired by the measured amount acquirer, and the output instructor for instructing the information output section to stop output of the sign information if a time-dependent change of the measured amount from the starting time determined by the starting time determiner is judged to satisfy an output stop condition, the sign information output apparatus is capable of appropriately judging whether or not output of the sign information should be stopped, based on a time-dependent change of the behavior of the vehicle in transverse directions thereof. Therefore, it is possible to stop output of the sign information at an appropriate time without being affected by temporary behaviors of the vehicle.

Preferably, the measured amount acquirer further acquires a measured amount after the output instructor has instructed the information output section to stop output of the sign information, and the output instructor instructs the information output section to re-output the sign information if the time-dependent change of the measured amount is judged to satisfy a re-output condition. Since the sign information, whose output has been stopped temporarily after the vehicle has been moved to return to its previous course or direction of travel, is output again, it is convenient for the driver to observe the sign information again.

Preferably, the output instructor instructs the information output section to stop output of the sign information by judging that the time-dependent change of the measured amount satisfies the output stop condition, if an absolute value of a time integral of the measured amount exceeds a first threshold value. By using a time integral of the measured amount, it is possible to accurately judge whether or not the behavior of the vehicle is temporary.

Preferably, the output instructor instructs the information output section to re-output the sign information by judging that the time-dependent change of the measured amount satisfies the re-output condition, if the absolute value of the time integral of the measured amount from the starting time becomes smaller than a second threshold value, which is smaller than the first threshold value, until a predetermined time elapses after the output instructor has instructed the information output section to stop output of the sign information. Thus, movement of the vehicle to return to its previous course or direction of travel can be detected accurately.

Preferably, the sign information output apparatus further comprises a directional change detector for detecting whether or not a direction of travel of the vehicle has changed, based on captured image signals that are successively acquired by the image capturing unit, and the starting time determiner determines as the starting time a time at which the directional change detector detects that the direction of travel of the vehicle starts to change. Inasmuch as the time at which the direction of travel of the vehicle is detected as starting to change is determined as the starting time, a judgment process based on the measured amount can be started at an appropriate time.

Preferably, the sign information output apparatus further comprises a measured amount acquirer for acquiring a measured amount that is correlated to a behavior of the vehicle in transverse directions thereof, and a starting time determiner for determining a starting time of a judgment process based on the measured amounts acquired by the measured amount acquirer, and the output instructor instructs the information output section to stop output of the sign information if a time-dependent change of the measured amount from the starting time determined by the starting time determiner satisfies an output stop condition.

Preferably, the output instructor instructs the information output section to stop output of the sign information by judging that the time-dependent change of the measured amount satisfies the output stop condition, if an absolute value of a time integral of the measured amount exceeds a first threshold value. By using a time integral of the measured amount, it is possible to accurately judge whether or not the behavior of the vehicle is temporary.

Preferably, the measured amount acquirer acquires as the measured amount a time-dependent change of a steering angle or a yaw rate of the vehicle. Therefore, the behavior of the vehicle in transverse directions can be detected accurately.

Preferably, the measured amount acquirer further acquires a measured amount after the output instructor has instructed the information output section to stop output of the sign information, and the output instructor instructs the information output section to re-output the sign information, if the time-dependent change of the measured amount is judged to satisfy a re-output condition. Since the sign information, whose output has been stopped temporarily after the vehicle has moved to return to its previous course or direction of travel, is output again, it is convenient for the driver to see the sign information again.

Preferably, the output instructor instructs the information output section to re-output the sign information by judging that the time-dependent change of the measured amount satisfies the re-output condition, if the absolute value of the time integral of the measured amount from the starting time becomes smaller than a second threshold value, which is smaller than the first threshold value, until a predetermined time elapses after the output instructor has instructed the information output section to stop output of the sign information. Thus, movement of the vehicle to return to its previous course or direction of travel can be detected accurately.

Preferably the starting time determiner determines as a starting time a time at which a blinker switch of the vehicle is turned on. By turning on the blinker switch, the driver expresses an intention to turn the vehicle thereafter. In other words, by determining as the starting time a time immediately before the vehicle is steered, a judgment process, which is based on the measured amount, can be started at an appropriate time.

Preferably, the measured amount acquirer further acquires a measured amount after the blinker switch has been turned off, until a predetermined time elapses and/or the vehicle travels a predetermined distance. Consequently, even if the blinker switch is turned back for some reason, the judgment process can be continued dependent on the elapsed time or the traveled distance.

Preferably, the output instructor instructs the information output section to stop output of the sign information if the time-dependent change of the measured amount, except for a time period in which the vehicle is stopping, satisfies the output stop condition. Since the time period during which the vehicle is stopping is excluded, the accuracy of the judgment process, which is based on a time-dependent change of the measured amounts, is increased.

Preferably, the sign information output apparatus further comprises a directional change detector for detecting whether or not a direction of travel of the vehicle has changed, based on captured image signals that are successively acquired by the image capturing unit, and the starting time determiner determines as the starting time a time at which the directional change detector detects that the direction of travel of the vehicle starts to change. Inasmuch as the time at which the vehicle is detected as starting to change its direction of travel is determined as the starting time, a judgment process based on the measured amount can be started at an appropriate time.

If the sign detector newly detects a sign, other than the sign which has been most recently detected while the vehicle is making a directional change, the output instructor outputs the sign information with respect to a type of the other sign, after the directional change detector has detected completion of the directional change. Consequently, the sign information, which has been output once, is prevented from not being output erroneously until the directional change of the vehicle is completed. This enhances convenience for the driver of the vehicle.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a view illustrating a manner in which the sign information output apparatus shown in FIG. 1 outputs sign information;

FIG. 6 is a diagram showing the data structure of an interval table shown in FIG. 4;

DESCRIPTION OF THE PREFERRED EMBODIMENTS

Sign information output devices according to preferred embodiments of the present invention will be described in detail below with reference to the accompanying drawings.
[Overall Configuration of Sign Information Output Apparatus 10]

Figure 1:
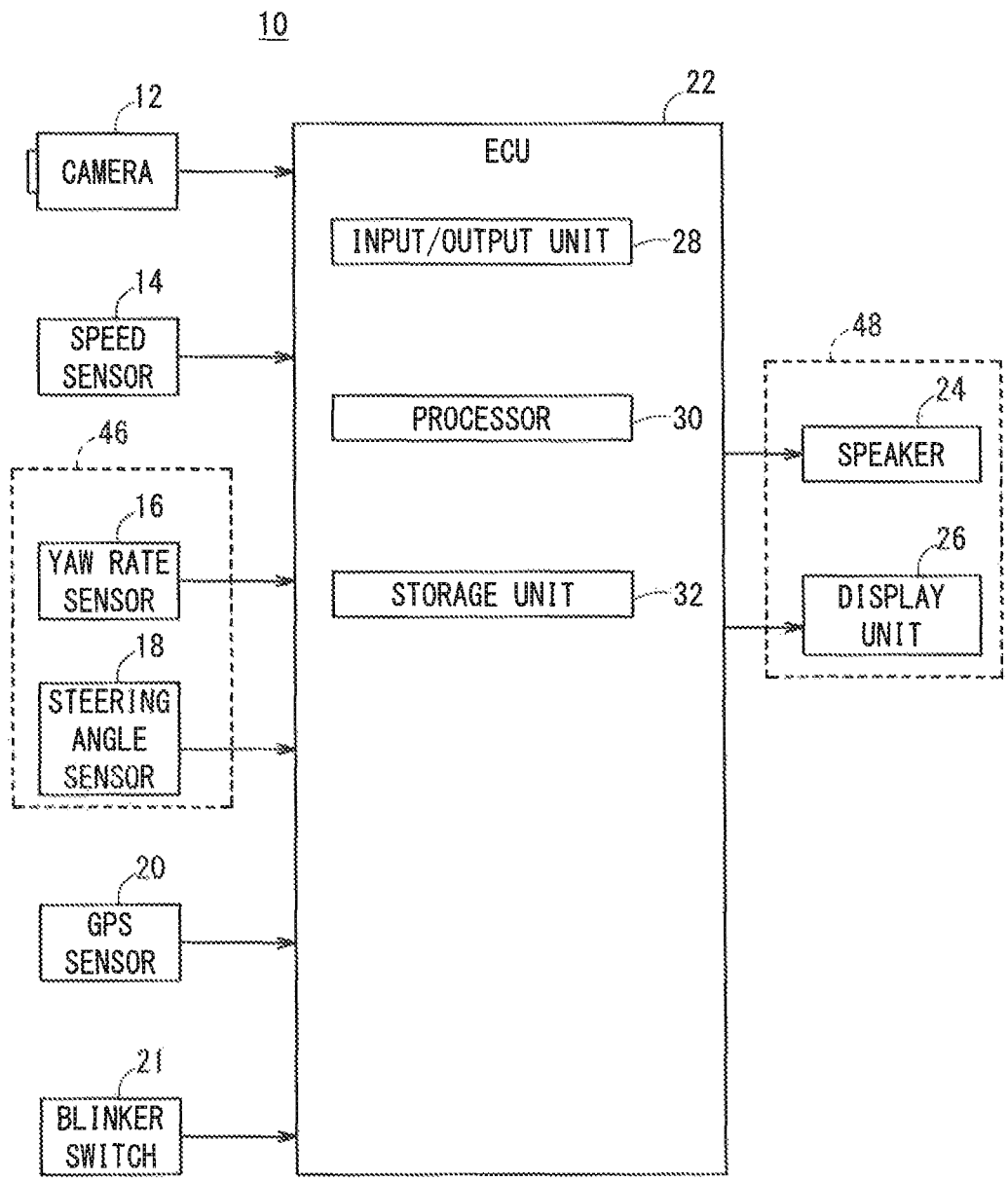
FIG. 1 is an electric block diagram showing only a configuration of a sign information output apparatus that is common to various embodiments of the present invention.

FIG. 1 is an electric block diagram showing a configuration of a sign information output apparatus 10, which is common to various embodiments of the present invention.

As shown in FIG. 1, the sign information output apparatus 10 includes a camera (image capturing unit) 12 for capturing an image around a vehicle 50 (see FIG. 2A, etc.), a speed sensor 14 for detecting the speed of the vehicle 50, a yaw rate sensor 16 for detecting the yaw rate of the vehicle 50, a steering angle sensor 18 for detecting the angle (steering angle) through which the steering wheel of the vehicle 50 is turned, a GPS (Global Positioning System) sensor 20 for detecting the present position of the vehicle 50, a blinker switch 21 for turning non-illustrated direction indicators of the vehicle 50 on and off, an ECU (Electronic Control Unit) 22 for controlling the sign information output apparatus 10, a speaker 24 for producing speech sounds, and a display unit 26 for displaying visible information.

The ECU 22 comprises a computer such as a microcomputer or the like. According to the present embodiment, the ECU 22 includes an input/output unit 28, a processor 30, and a storage unit 32.

Various signals from the camera 12, the speed sensor 14, the yaw rate sensor 16, the steering angle sensor 18, the GPS sensor 20, and the blinker switch 21 are supplied through the input/output unit 28 to the ECU 22. Various signals from the ECU 22 are supplied through the input/output unit 28 to the speaker 24 and the display unit 26. The input/output unit 28 includes an A/D converter (not shown) for converting supplied analog signals into digital signals.

The processor 30 carries out processing operations on various signals that are supplied thereto through the input/output unit 28, and generates control signals for the speaker 24 and the display unit 26 based on the results of such processing operations. Various functions of the processor 30 are performed by reading programs, which are either stored in the storage unit 32 or are supplied from an external source through a non-illustrated wireless communications device, such as a cellular phone, a smartphone, or the like.

The storage unit 32 includes a RAM (Random Access Memory) for storing captured image signals that have been converted into digital signals, temporary data for use in the processing operations, and the like, and a ROM (Read Only Memory) for storing the programs, tables, and maps, etc.

The yaw rate sensor 16 and the steering angle sensor 18 jointly make up a measured amount acquirer 46 for acquiring a measured amount, i.e., a time-dependent change of the yaw rate or the steering angle, which is correlated to the behavior of the vehicle 50 in transverse directions thereof.

The speaker 24 and the display unit 26 jointly make up an information output section 48 for outputting sign information representing the type of sign that has been detected. The information output section 48 is capable of outputting forms of information, which can be recognized through the five human physical senses, including images (still/moving images), characters, and sounds.

Figure 2A:
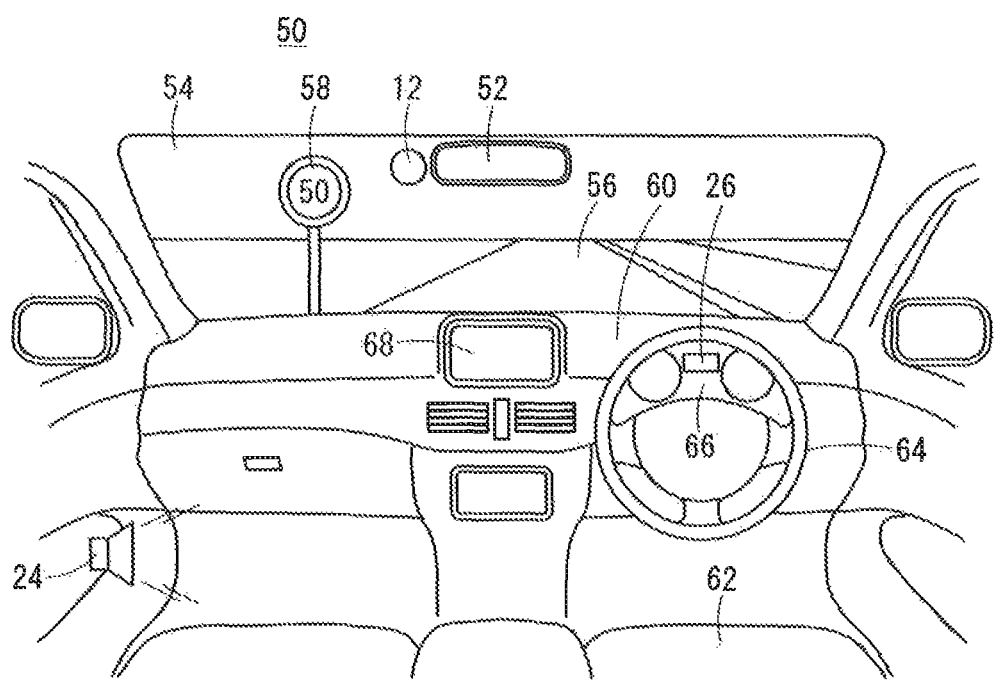
FIG. 2A is a perspective view of the interior of a vehicle that incorporates the sign information output apparatus shown in FIG. 1, as viewed from the perspective of the driver of the vehicle.
Figure 2B:
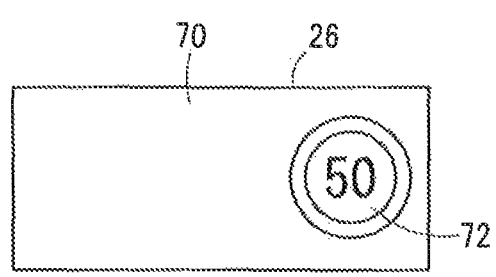
FIG. 2B is a front elevational view of a display unit shown in FIG. 2A.

FIG. 2A shows in perspective the interior of the vehicle 50, which incorporates the sign information output apparatus 10 shown in FIG. 1, as viewed from the perspective of the driver of the vehicle 50. FIG. 2B shows in front elevation the display unit 26 shown in FIG. 2A. The vehicle 50 is shown to be driving on a road in a country in which automobiles are legally required to drive on the left side of the road, and the vehicle 50 is shown as having a right-hand steering wheel.

As shown in FIG. 2A, the camera 12 is disposed in the passenger compartment of the vehicle 50 in the vicinity of a rearview mirror 52. The camera 12 captures an image of an area (including a road 56 and a sign 58) around the vehicle 50 through a front windshield 54. The camera 12 comprises a digital video camera, for example, which is capable of capturing successive images at a predetermined frame clock rate of 30 frames per second, for example.

A steering wheel 64 projects toward the driver's seat 62 from a lower portion of a dashboard 60. The dashboard 60 has an instrument panel 66 positioned behind the steering wheel 64, and includes an MID (Multi-Information Display) as the display unit 26, which is positioned above the center of the steering wheel 64. The driver, who is seated in the driver's seat, can observe the display unit 26 while the face of the driver is directed in a forward direction of the vehicle 50. A general-purpose display unit 68 is disposed on the dashboard 60 at a position to the left of the display unit 26. Instead of the MID, the general-purpose display unit 68 may be used as the display unit 26.

As shown in FIG. 2B, the display unit 26 has a display area 70, which is of a horizontal elongate rectangular shape. The display area 70 displays in a right-hand region thereof at least one type of sign information 72 that simulates the sign 58. In addition to the sign information 72, the display unit 26 is capable of displaying a mileage, a present time, and other information concerning the instrument board 66, etc.

[Operation of Sign Information Output Apparatus 10]

The sign information output apparatus 10, which is common to the various embodiments of the present invention, basically is constructed as described above. An output process of the sign information output apparatus 10 will be described below with reference to FIG. 3. According to the present embodiment, a process of outputting the sign information 72, and a process of disabling output of the sign information 72 will collectively be referred to as an "output process".

As shown in FIG. 3, it is assumed that the vehicle 50 is driven on a road 56 that has a speed limit of 50 [kph]. As the vehicle 50 travels straight from the left to the right in FIG. 3, the vehicle 50 passes a sign 58 located on a peripheral edge of the road 56. If the sign 58 is located at a position far ahead of the vehicle 50, then since the sign 58 is not detected by the sign information output apparatus 10, no information is displayed in the display area 70.

Next, when the vehicle 50 reaches an area in proximity to the sign 58, the sign information output apparatus 10 (particularly, the ECU 22) detects the presence and type of the sign 58, and instructs the display unit 26 to display sign information 72 depending on the type of sign 58. Upon observing the sign information 72 displayed on the display unit 26, the driver of the vehicle 50 easily recognizes that the road 56 on which the vehicle 50 is currently traveling has a speed limit of 50 [kph].

Thereafter, if the vehicle 50 travels a certain distance, e.g., a threshold value Lth, without detecting the presence of another sign, the ECU 22 instructs the display unit 26 to stop output of the sign information 72. As a result, the sign information 72, which has been displayed in the display area 70, disappears.

[First Embodiment]

The sign information output apparatus 10, which includes an ECU 22A (one form of the ECU 22) according to a first embodiment of the present invention, will be described below with reference to FIGS. 4 through 9.

<Configuration of ECU 22A>

Figure 4:
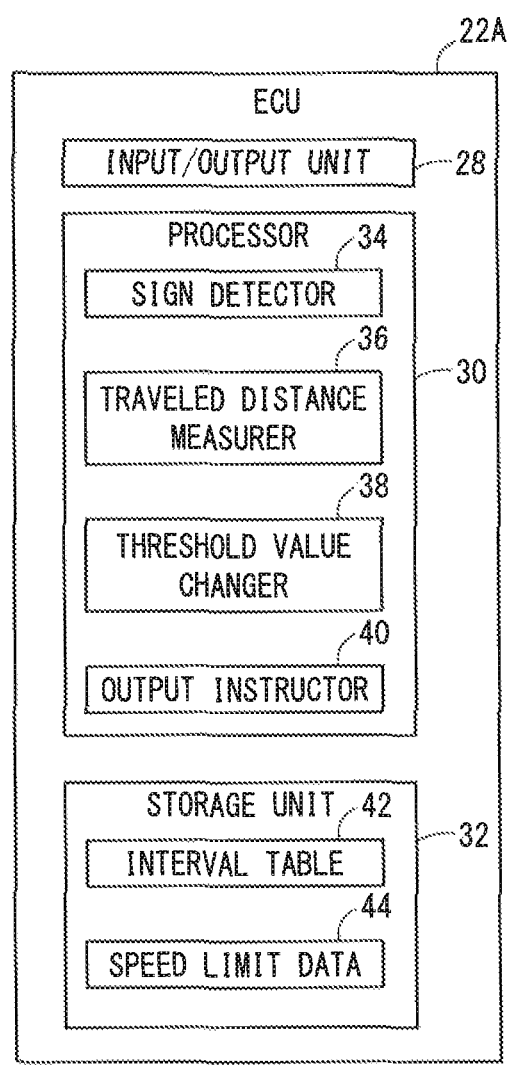
FIG. 4 is a detailed block diagram of an ECU according to a first embodiment of the present invention.

FIG. 4 shows a detailed block diagram of the ECU 22A according to the first embodiment. The ECU 22A includes a processor 30 that functions as a sign detector 34, a traveled distance measurer 36, a threshold value changer 38, and an output instructor 40. The ECU 22A also has a storage unit 32, which stores an interval table 42 and speed limit data 44.

<Operations with Respect to Output Process for Outputting Sign Information 72>

Figure 5:
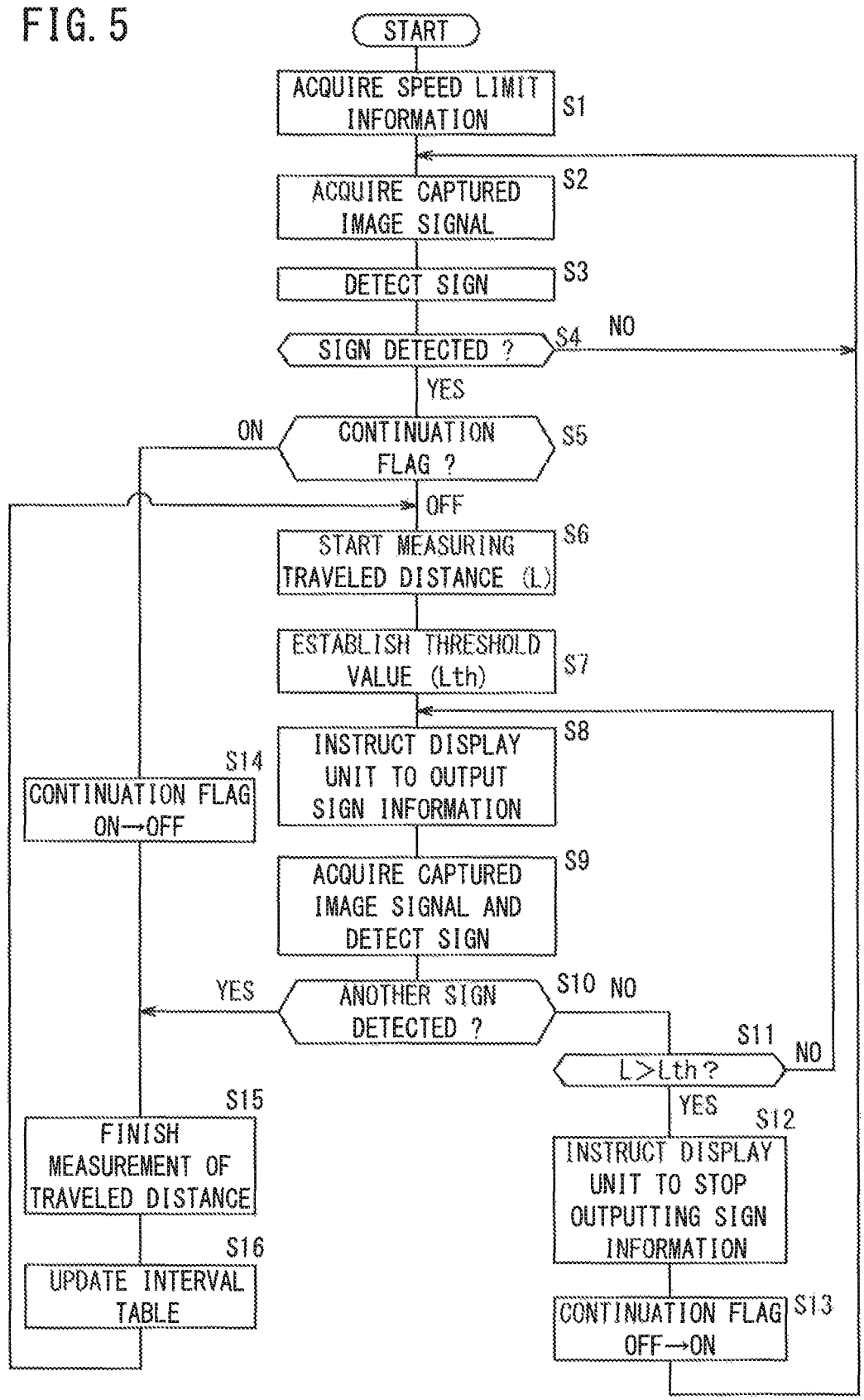
FIG. 5 is a flowchart of an operation sequence of the sign information output apparatus (the ECU shown in FIG. 4) according to the first embodiment.

Operation of the sign information output apparatus 10 (the ECU 22A shown in FIG. 4) according to the first embodiment will be described in detail below, primarily with reference to the flowchart shown in FIG. 5.

In step S1, the ECU 22A acquires speed limit data 44 as information concerning the speed limit for the vehicle 50 (hereinafter referred to as "speed limit information"). Prior to acquisition of the speed limit data 44, the GPS sensor 20 acquires the present position of the vehicle 50 based on a received GPS signal. The ECU 22 reads map data, not shown, from the storage unit 32, and refers to the map data in order to acquire speed limit data 44 corresponding to the present position.

The speed limit data 44 include not only the speed limit (value and unit system) of the road 56, but also a jurisdictional region (country, state, district) of the road 56 and the type of road 56 (a general road or an expressway), which serve as metadata of the speed limit.

The map data include route calculation data that are used in calculating a recommended route, route guidance data such as the names of intersections, names of roads, etc., which are used to guide the vehicle 50 to a destination according to a recommended route, road data representing the shapes of roads, and background data representing shapes on the map other than roads, such as coastlines, rivers, railroads, buildings, etc.

In step S2, the ECU 22A acquires a captured image signal per frame, representing an image in front of the vehicle 50 that lies within a predetermined angle of view, and temporarily stores the captured image signal in the storage unit 32. If the camera 12 comprises an RGB camera, for example, then the captured image signal from the camera 12 is a multi-gradation image in three color channels.

In step S3, from an image area represented by the captured image signal, the sign detector 34 detects a sign 58 that is present on the peripheral edge of the road 56. Any of various image recognition processes, such as a template matching process, for example, which conforms to the type of sign 58, may be used by the sign detector 34 in order to detect the sign 58. The type of sign 58 that is capable of being detected may be a guide sign indicating a region, a direction, or the like, a warning sign indicating a reduction in the number of lanes or the like, a restrictive sign indicating a maximum speed or the like, an indication sign that indicates a pedestrian crossing or the like, or an auxiliary sign indicating a vehicle type or the like. The sign detector 34 may further detect whether the road 56 is a general road or an expressway, by extracting a numerical value represented by a sign 58 having a particular shape.

In step S4, the ECU 22A judges whether or not at least one sign 58 was detected in step S3. If the ECU 22A judges that a sign has not been detected (step S4: NO), control returns to step S2, and steps S2 and S3 are repeated. If the ECU 22A judges that at least one sign 58 has been detected (step S4: YES), control proceeds to step S5.

In step S5, the traveled distance measurer 36 confirms the value of a flag (hereinafter referred to as a "continuation flag") for judging whether or not measurement of a traveled distance L should be continued. Since the value of the continuation flag initially is set to "OFF" (step S5: OFF), control proceeds to step S6.

In step S6, in response to the detection of the sign 58, the traveled distance measurer 36 begins to measure a traveled distance L over which the vehicle 50 has traveled. The traveled distance measurer 36 can measure a traveled distance L by integrating the speed of the vehicle 50, which is detected by the speed sensor 14, or by tracking the position of the vehicle 50, which is detected by the GPS sensor 20. The traveled distance measurer 36 may begin to measure the traveled distance L not only at the time that the sign 58 is detected initially, but also at the time that the vehicle 50 reaches the sign 58, or at another time established as desired.

In step S7, the threshold value changer 38 establishes a threshold value Lth used for the output instructor 40 to stop output of the sign information 72. A specific process of establishing the threshold value Lth will be described later.

In step S8, the output instructor 40 instructs the display unit 26 to output sign information 72. In response to such an instruction, the display unit 26 newly displays in the display area 70 sign information 72 (see FIG. 2B, etc.) concerning the type of sign 58.

In step S9, the ECU 22A acquires a captured image signal, and detects a sign in the same manner as in steps S2 and S3.

In step S10, the sign detector 34 judges whether or not a next sign (hereinafter referred to as a "next sign 58"), which differs from the sign 58 but is of the same type as the sign 58, has been detected. If the sign detector 34 judges that a next sign 58 has not been detected (step S10: NO), then in step S11, the output instructor 40 compares the traveled distance L, which has been measured from step S6, with the threshold value Lth established in step S7.

If the relationship L>Lth is not satisfied (step S11: NO), or stated otherwise, if the relationship L≤Lth is satisfied, control returns to step S8, and steps S8 and S9 are repeated. If the relationship L>Lth is satisfied (step S11: YES), control proceeds to step S12.

In step S12, the output instructor 40 instructs the display unit 26 to stop output of the sign information 72. As a result, the sign information 72, which has been displayed in the display area 70, disappears.

In step S13, the processor 30 changes the continuation flag from "OFF" to "ON". It should be noted that the traveled distance measurer 36 continues to measure the traveled distance L, although the display unit 26 has stopped output of the sign information 72.

Thereafter, control returns to step S2, and the ECU 22A repeats steps S2 and S3 until a next sign 58 is detected. If a next sign 58 is detected (step S4: YES), and the traveled distance measurer 36 confirms that the continuation flag is "ON" (step S5: ON), control proceeds to step S14.

In step S14, the processor 30 changes the continuation flag from "ON" to "OFF". Thereafter, in step S15, the traveled distance measurer 36 completes measurement of the traveled distance L, and temporarily stores the measured traveled distance L in the storage unit 32.

In step S16, under a predetermined updating condition, the processor 30 updates the traveled distance L, which was obtained in step S15, as a stored value in the interval table 42.

Thereafter, control returns to step S6, whereupon the traveled distance measurer 36 successively executes steps S6 through S11. Thus, the sign information output apparatus 10 performs the output process for outputting sign information 72, by successively carrying out steps S1 through S16 of FIG. 5 while the vehicle 50 is being driven.

<Process of Statically Changing Threshold Value Lth>

A specific process of statically changing the threshold value Lth, which is carried out by the threshold value changer 38, will be described below. Prior to establishing and changing the threshold value Lth, the threshold value changer 38 selectively reads from the storage unit 32 one of a plurality of tables contained in the interval table 42.

FIG. 6 shows the data structure of the interval table 42 shown in FIG. 4. As shown in FIG. 6, the interval table 42 includes three tables, i.e., a first table, a second table, and a third table, all of which share the same data format. Each of the tables is related to a numerical value (hereinafter referred to as a "sign value") of the speed limit indicated by the sign 58, or the type of road 56 on which the vehicle 50 is driven.

The first table is used when the sign value falls in a range from 0 to 40, or when the type of road 56 represents a general road. All of the first through fifth stored values in the first table are represented by "150" (unit: m) as an initial value.

The second table is used when the sign value falls in a range of 70 or greater, or when the type of road 56 represents an expressway. All of the first through fifth stored values in the first table are represented by "1000" (unit: m) as an initial value.

A speed unit system of kilometers per hour (kph) is primarily used in France, whereas a speed unit system of miles per hour (mph) is primarily used in the U.K. Usually, the numerical value, e.g., 50, of the speed limit is indicated as a sign 58 with the unit system omitted. Therefore, depending on a range to which a sign value belongs, it may be impossible to judge whether the sign value corresponds to a speed limit on general roads or expressways. Further, in view of different speed unit systems, which are used in different jurisdictional regions in which the road 56 exists, the interval table 42 includes another table as the third table, which can be shared by both general roads and expressways.

The third table is used when the sign value falls in a range from 41 to 69, or when the type of road 56 represents a general road (kph) or an expressway (mph). All of the first through fifth stored values in the first table are represented by "250" (unit: m) as an initial value.

Depending on the speed limit data 44 or the speed of the vehicle 50, the threshold value changer 38 selectively reads one of the first through third tables, and establishes the stored value of the selected table as a threshold value Lth. Specific examples, i.e., first through fifth examples, of the process of statically changing the threshold value Lth will be described in detail below.

(First Example)

The threshold value changer 38 may establish and change a threshold value Lth, depending on the jurisdictional region in which the road 56 exists, as the limit speed data 44. Since the jurisdictional region in which the road 56 exists is taken into account, the timing for stopping output of the sign information 72 is determined more appropriately.

More specifically, if the jurisdictional region in which the road 56 exists is "Country A", then the threshold value changer 38 reads the stored value (Lth=150 [m]) of the first table, and if the jurisdictional region in which the road 56 exists is "Country B", then the threshold value changer 38 reads the stored value (Lth=250 [m]) of the third table. Thereafter, the threshold value changer 38 multiplies the read value, e.g., 250, by a margin coefficient, which is represented by a positive number of 1 or greater, e.g., 1.2, thereby producing the numerical value 250 [m]×1.2=300 [m]. The threshold value changer 38 sets the threshold value Lth to the produced numerical value 300, and supplies the threshold Lth=300 to the output instructor 40.

(Second Example)

The threshold value changer 38 may establish and change the threshold value Lth, depending on the value of the sign 58, as the limit speed data 44. The threshold value changer 38 selects and reads one of the first through third tables that corresponds to the sign value detected by the sign detector 34. In FIG. 3, since the sign value indicates "50", the threshold value changer 38 selects and reads the third table.

(Third Example)

The threshold value changer 38 may establish and change the threshold value Lth, depending on the type of road 56, as the limit speed data 44. In view of the fact that the interval at which signs 58 are placed tends to differ depending on the type of road 56, the timing for stopping output of the sign information 72 is determined more appropriately.

More specifically, the threshold value changer 38 may select or change either one of a first threshold value (150 [m]×1.2=180 [m]) for general roads, and a second threshold value (1000 [m]×1.2=1200 [m]) for expressways. Therefore, based on the number indicated by the sign 58, i.e., the numerical value of the speed limit, the threshold value changer 38 can select a threshold value Lth that is suitable for a general road or an expressway.

(Fourth Example)

If the sign detector 34 is incapable of judging the type of road 56, then the threshold value changer 38 may select or change a third threshold value (300 [m]), which differs from the first threshold value and the second threshold value. Therefore, the threshold value changer 38 is compatible with various numerical ranges and various unit systems, and since only three threshold values need to be held, the amount of data stored in the storage unit 32 can be reduced.

(Fifth Example)

The threshold value changer 38 may establish and change a threshold value Lth depending on the speed of the vehicle 50. This is because the speed of the vehicle 50 is highly correlated to the speed limit of the road 56 on which the vehicle 50 is being driven. More specifically, the threshold value changer 38 may estimate the speed limit of the road 56 based on a time series of speeds of the vehicle 50, which are successively detected by the speed sensor 14. Further, the threshold value changer 38 may select a table in the same manner as in the second example. Alternatively, the interval table 42 per se may be associated with the speed of the vehicle 50.

In this manner, the threshold value changer 38 may establish and change a threshold value Lth depending on the speed limit data 44, or depending on the speed of the vehicle 50. This process is particularly effective in a jurisdictional region in which the signs 58 are placed at substantially constant intervals.

<Process of Dynamically Changing Threshold Value Lth>

A specific process of dynamically changing the threshold value Lth, which is carried out by the threshold value changer 38, will be described in detail below with reference to FIGS. 7 through 9.

As described above, in a jurisdictional region in which the signs 58 are placed at substantially constant intervals, it is preferable to statically change the threshold value Lth, i.e., a typical value of the intervals at which the signs 58 are placed. However, the static process may not be appropriate for roads 56 on which the signs 58 are placed at significantly different intervals. More specifically, while the vehicle 50 is being driven on a road 56 that runs through different jurisdictional regions (countries, areas, regions), the intervals at which signs 58 are placed, or the patterns of the signs 58 may suddenly change.

According to the present embodiment, the threshold value changer 38 performs a process of dynamically changing the threshold value Lth, based on information (hereinafter referred to as "interval information") concerning the intervals at which signs 58 of one type are placed, in addition to the process of dynamically changing the threshold value Lth. The interval information represents not only the traveled distance L that the vehicle 50 has traveled after the sign 58 has been detected and until a next sign 58 is detected, but also a measured value based on the captured image signal from the camera 12, and a measured value based on the GPS signal from the GPS sensor 20.

Figure 7:
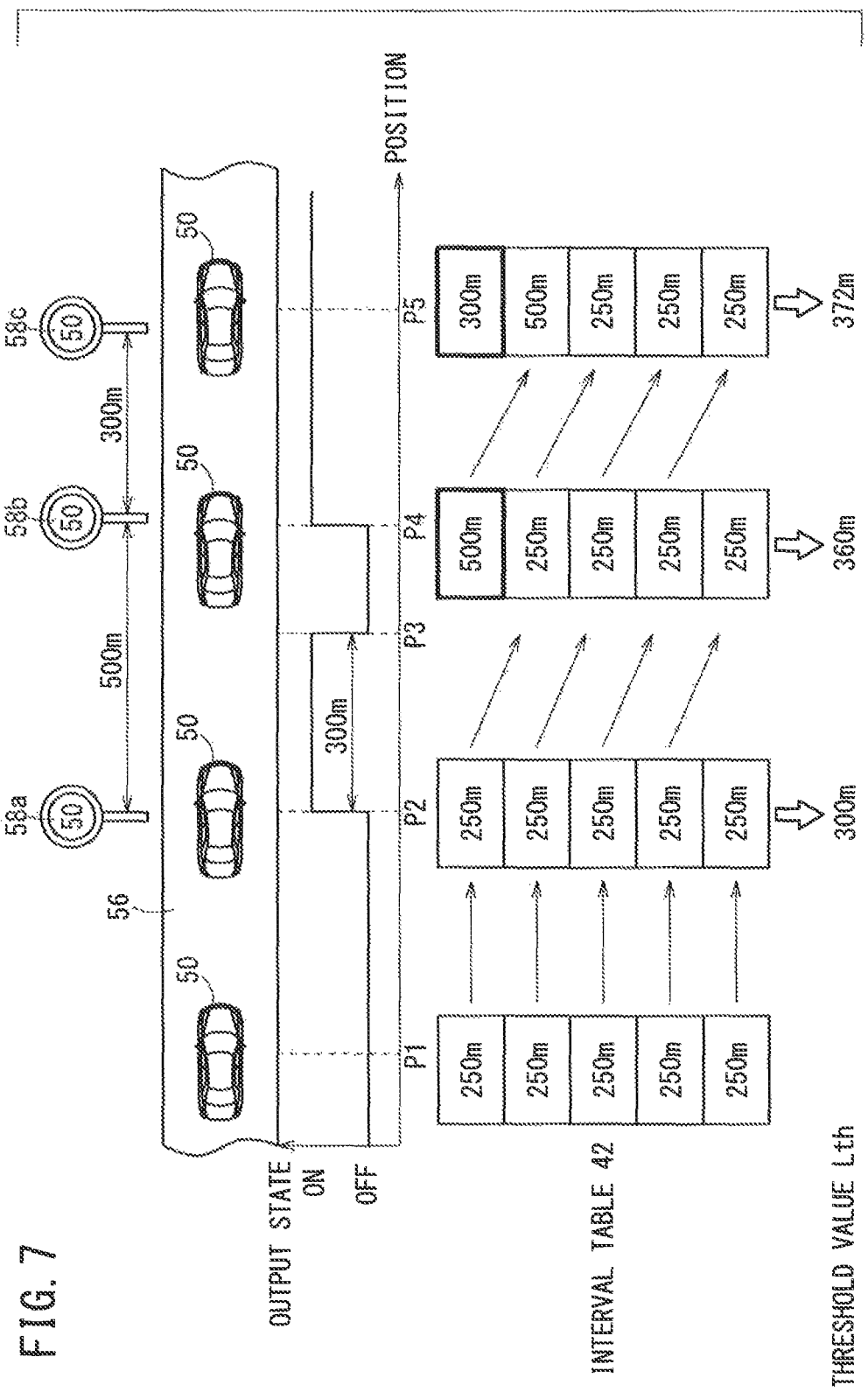
FIG. 7 is a view illustrating a first threshold value changing process.

As shown in FIG. 7, it is assumed that the vehicle 50 is being driven on a road 56 having a speed limit of 50 [kph]. As the vehicle 50 travels straight from position P1 to position P5, the vehicle 50 successively passes signs 58a, 58b, 58c on a peripheral edge of the road 56. The signs 58a, 58b, 58c, each of which has a sign value of "50" (unit: kph), are placed on the left side of the road 56 with respect to the direction of travel of the vehicle 50. The signs 58a, 58b are spaced from each other at an interval of 500 [m], whereas the signs 58b, 58c are spaced from each other at an interval of 300 [m].

At position P1, the third table, in which all of the first through fifth stored values represent "250" and the sign value falls in the range from 41 to 69, is selected out of the three tables of the interval table 42. During a zone from position P1 to position P2, since none of the signs 58a, 58b, 58c is detected, the display unit 26 has an output state of "OFF (not displayed)". The interval table 42 remains in its initial state, and the threshold value Lth is not set to any value yet.

At position P2, the first sign 58a is detected. The display unit 26 changes from the output state of "OFF" to an output state of "ON (displayed)", and the threshold value Lth is set to Lth=1.2×(250+250+250+250+250)/5=300 [m]. It should be noted that the threshold value changer 38 calculates the threshold value Lth by multiplying an average value (statistical value) of the five stored values by a margin coefficient, which is represented by a positive number of 1 or greater, e.g., 1.2.

At position P3, since the traveled distance L from position P2 reaches Lth=300 [m], the display unit 26 changes from the output state of "ON" to the output state of "OFF". Thereafter, even after position P3, the traveled distance measurer 36 continues to measure the traveled distance L.

At position P4, the second sign 58b is detected. The display unit 26 changes from the output state of "OFF" to the output state of "ON". The measured traveled distance L=500 [m] is stored as the first stored value, which is enclosed by a thick rectangular frame in the interval table 42, according to a FIFO (First-In First-Out) method. The threshold value Lth is changed to Lth=1.2×(500+250+250+250+250)/5=360 [m].

At position P5, the third sign 58c is detected. The display unit 26 remains in the output state of "ON". The measured traveled distance L=300 [m] is stored as the first stored value, which is enclosed by a thick rectangular frame in the interval table 42, according to a FIFO (First-In First-Out) method. The threshold value Lth is changed to Lth=1.2×(300+500+250+250+250)/5=372 [m].

As described above, the traveled distance measurer 36 measures a distance L from the previously detected sign 58a or 58b up to the next detected sign 58b or 58c that is detected as being of the same type as the sign 58a or 58b. The threshold value changer 38 changes the threshold value Lth as interval information depending on the traveled distance L. Inasmuch as the interval at which the signs are placed, which is actually measured while the vehicle 50 is being driven, is taken into account, the timing for stopping output of the sign information 72 is determined more appropriately.

The storage unit 32 successively stores respective measured traveled distances L. The threshold value changer 38 changes the threshold value Lth according to a learning process, which uses a plurality of traveled distances L stored immediately before as inputs, and uses the threshold value Lth as an output. Therefore, an appropriate threshold value Lth, which is based on a result measured immediately before, can be obtained. The algorithm of the learning process is not limited to a statistical process including an averaging process, but may be any of various machine learning processes, including any one of a supervised learning process, an unsupervised learning process, and a reinforcement learning process. Examples of learning architecture include a boosting process, which may include AdaBoost, an SVM (Support Vector Machine), a neural network, and an EM (Expectation Maximization) algorithm.

As shown in FIG. 7, the interval table 42 is updated each time that the traveled distance L is measured. However, a different process may be employed.

(First Example)

Figure 8:
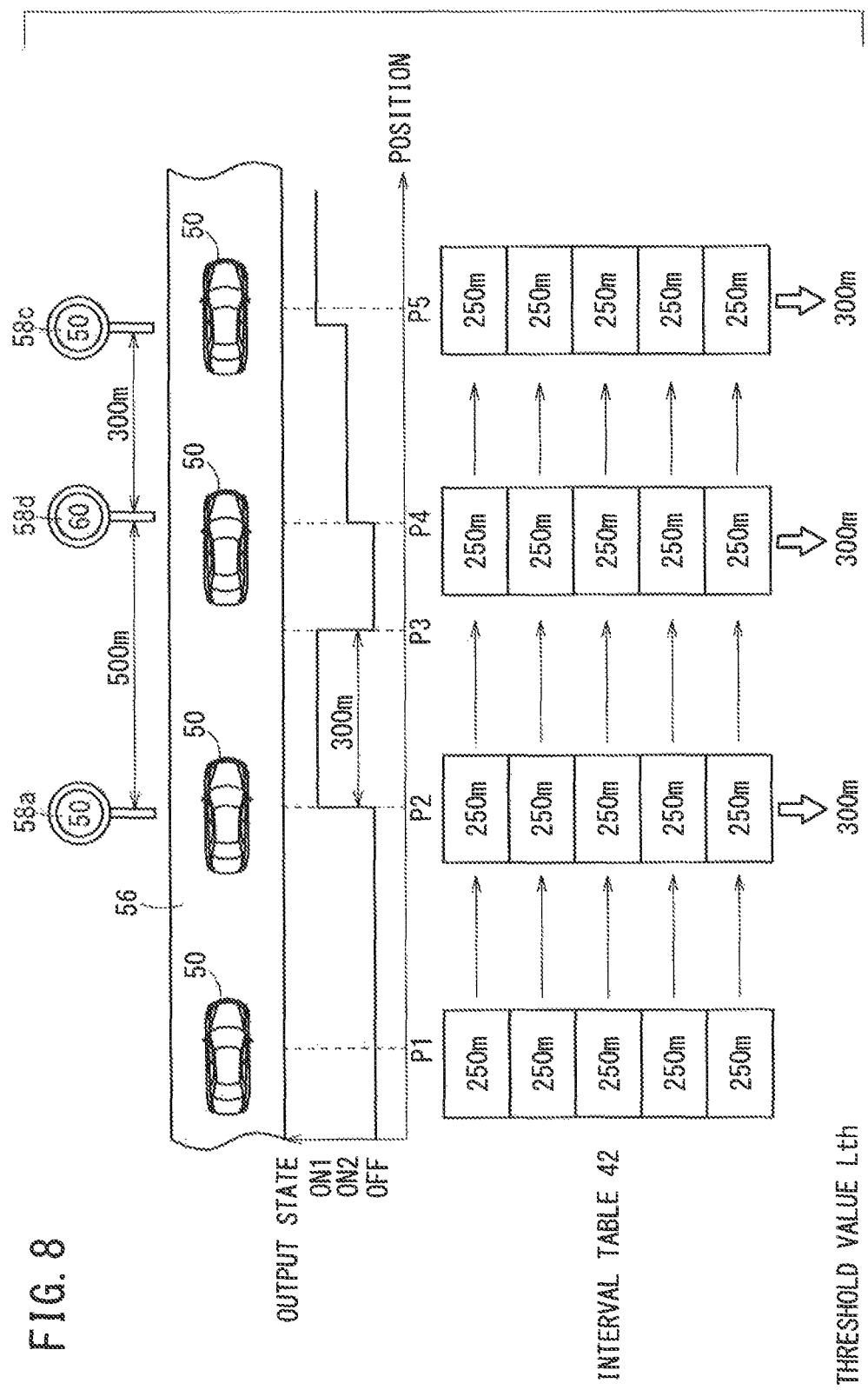
FIG. 8 is a view illustrating a second threshold value changing process.

As shown in FIG. 8, it is assumed that the vehicle 50 is being driven on a road 56 that has a speed limit of 50 [kph]. The example shown in FIG. 8 differs from the example shown in FIG. 7, in that a sign 58d having a sign value of "60" is specifically placed instead of the sign 58b having the sign value of "50". The display unit 26 has an output state of "ON1", which represents an ON state of the sign information 72 about "50", and an output state of "ON2", which represents an ON state of the sign information 72 about "60".

While the vehicle 50 is being driven from position P1 to position P3, the same process as that shown in FIG. 7 is carried out. At position P4, when the second sign 58d is detected for the first time, a traveled distance L=500 [m] is measured as the interval between the signs 58a, 58d.

The storage unit 32 stores the traveled distance L if the numerical values of the speed limits indicated by the two adjacent signs 58a, 58d are the same, and does not store the traveled distance L if the numerical values of the speed limits indicated by the two adjacent signs 58a, 58d are not the same. In FIG. 8, since "60" of the sign 58d, which is currently detected, is different from "50" of the sign 58a, which was detected previously, the storage unit 32 does not store the traveled distance L=500 [m], but maintains the threshold value Lth=300 [m].

At position P5, when the third sign 58c is detected for the first time, a traveled distance L=300 [m] is measured as the interval between the signs 58d, 58c. Since "50" of the sign 58c, which is currently detected, is different from "60" of the sign 58d, which was detected previously, the storage unit 32 does not store the traveled distance L=300 [m], but maintains the threshold value Lth=300 [m].

As described above, the signs 58a through 58c, and 58d, which are indicative of different numerical values, may exist together on the same road 56. In view of the fact that the signs 58a through 58c, which are indicative of the same numerical value, are placed in a cyclic pattern, by precluding measured results that have different numerical values, the processing accuracy of the learning process can be increased.

(Second Example)

Figure 9:
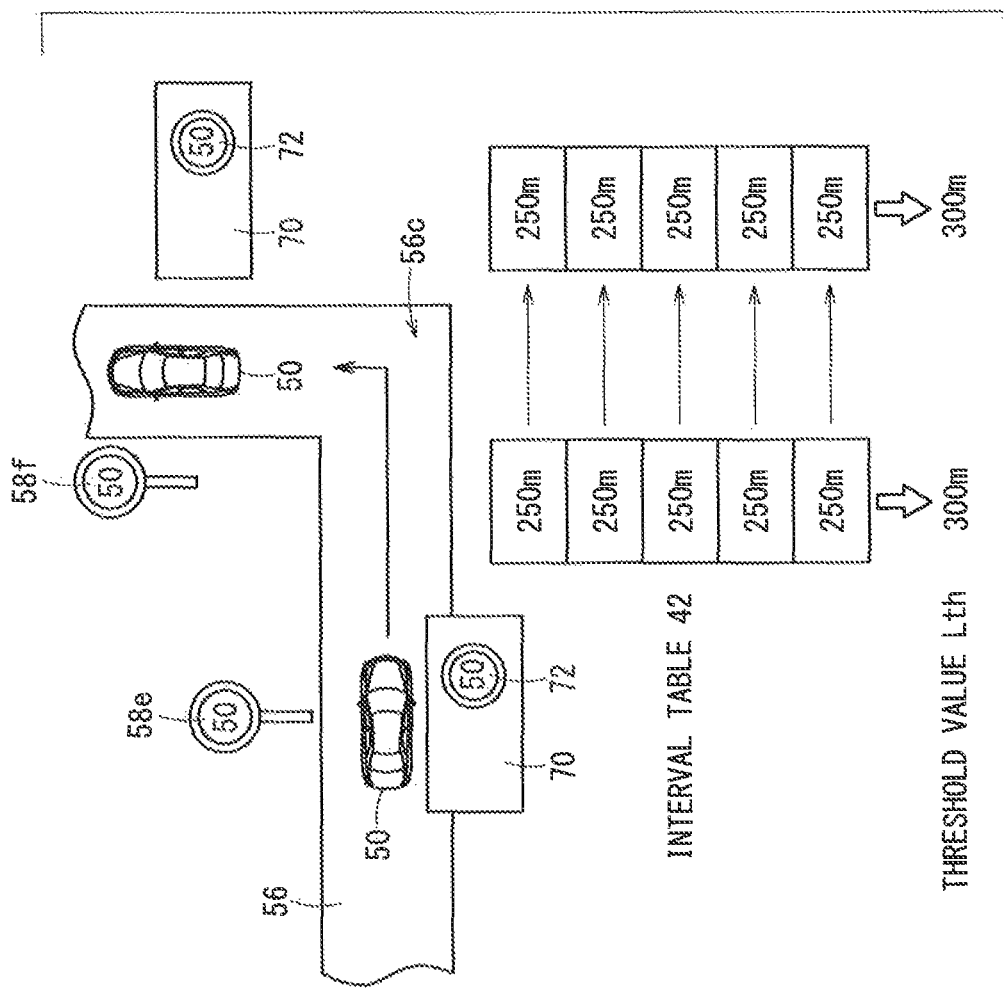
FIG. 9 is a view illustrating a third threshold value changing process.

As shown in FIG. 9, it is assumed that the vehicle 50 is being driven on a road 56 that has a speed limit of 50 [kph]. The example shown in FIG. 9 differs from the example shown in FIG. 7, in that the road 56 has an L-shaped bend 56c. The vehicle 50 successively passes a sign 58e, which is positioned before the bend 56c, and a sign 58f, which is positioned after the bend 56c.

The ECU 22A carries out a known judging process, based on various signals from the camera 12, the yaw rate sensor 16, etc., in order to detect a change in the travel direction of the vehicle 50. If the travel direction along which the vehicle 50 travels changes while the traveled distance L is being measured, then the storage unit 32 does not store the traveled distance L, even though the numerical values of the speed limits indicated by the two adjacent signs 58e, 58f agree with each other. Since it is highly possible that the vehicle 50 may be changing lanes when the travel direction of the vehicle 50 changes, by precluding the measured result in this manner, the processing accuracy of the learning process can be increased.

[Advantages of the First Embodiment]

As described above, the sign information output apparatus 10 according to the first embodiment includes the camera 12, which is mounted on the vehicle 50 for capturing an image, and acquires a captured image signal representing the captured image while the vehicle 50 is being driven, the sign detector 34 for detecting the sign 58 on the peripheral edge of the road 56 from an image area represented by the captured image signal, the information output section 48 for outputting the sign information 72 with respect to the type of sign 58, the traveled distance measurer 36 for measuring the traveled distance L over which the vehicle 50 has traveled in response to the detection of the sign 58, the output instructor 40 for instructing the information output section 48 to stop output of the sign information 72 if the traveled distance L exceeds the threshold value Lth, and the threshold value changer 38 for changing the threshold value Lth depending on at least one of the interval information with respect to the interval at which signs 58 of one type are placed, the speed limit information with respect to the speed limit of the road 56, and the speed of the vehicle 50.

The sign information output apparatus 10, which is arranged in the foregoing manner, is capable of establishing a maximum traveled distance, i.e., the threshold value Lth, over which the sign information 72 can be output continuously, in view of at least one of the interval at which the signs 58 are placed, the speed limit of the road 56, and the speed of the vehicle 50. Therefore, it is possible to stop output of the sign information 72 at an appropriate time, regardless of different areas in which the vehicle 50 is driven.

The sign information output apparatus 10 may include the threshold value changer 38 for changing the threshold value Lth depending on the type of road 56. In view of the fact that the interval at which signs 58 are placed tends to differ depending on the type of road 56, the timing for stopping output of the sign information 72 is determined more appropriately.

The sign information output apparatus 10 may include the threshold value changer 38 for changing the threshold value Lth depending on the jurisdictional region of the road 56. Since the jurisdictional region in which the road 56 exists is taken into account, the timing for stopping output of the sign information 72 is determined more appropriately.

[Second Embodiment]

A sign information output apparatus 10 incorporating an ECU 22B (one form of the ECU 22) according to a second embodiment of the present invention will be described below with reference to FIGS. 10 through 22.

<Configuration of ECU 22B>

Figure 10:
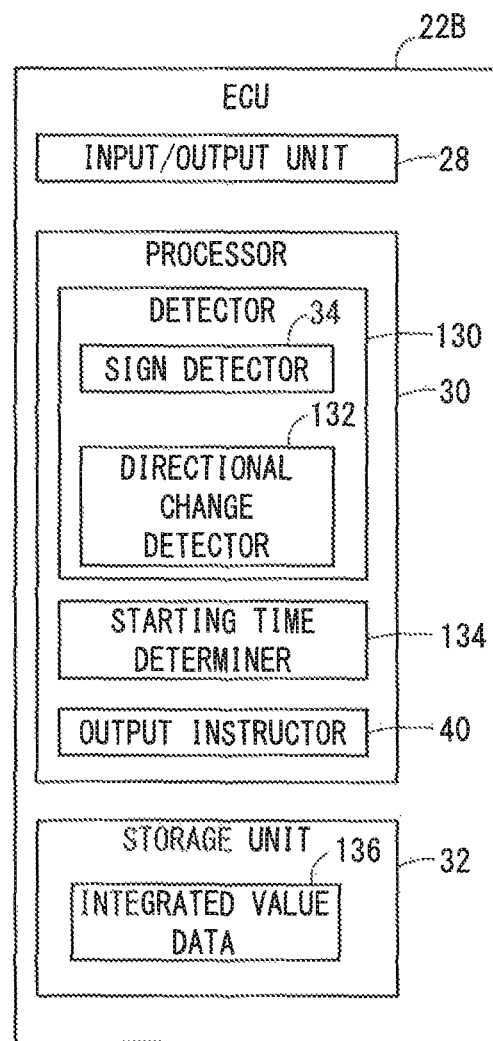
FIG. 10 is a detailed block diagram of an ECU according to a second embodiment of the present invention.

FIG. 10 is a detailed block diagram of the ECU 22B according to the second embodiment. The ECU 22B includes a processor 30, which functions as a detector 130 (including a sign detector 34 and a directional change detector 132), a starting time determiner 134, and an output instructor 40.

The ECU 22B also includes a storage unit 32, which stores integrated value data 136, to be described later.

<Operation of Sign Information Output Apparatus 10>

Operation of the sign information output apparatus 10 (the ECU 22B shown in FIG. 10) according to the second embodiment will be described in detail below, primarily with reference to the flowchart shown in FIG. 11.

In step S21, the ECU 22B acquires a captured image signal per frame, which represents an image in front of the vehicle 50 within a predetermined angle of view, and temporarily stores the captured image signal in the storage unit 32. In step S21, the ECU 22B operates in the same manner as step S2 of the first embodiment (FIG. 5).

In step S22, the sign detector 34 detects a sign 58, which is present on the peripheral edge of the road 56, from an image area represented by the captured image signal. In step S22, the ECU 22B operates in the same manner as step S3 of the first embodiment (FIG. 5).

In step S23, the ECU 22B judges whether or not at least one sign 58 has been detected in step S22. If the ECU 22B judges that a sign has not been detected (step S23: NO), control returns to step S21, and steps S21 and S22 are repeated. If the ECU 22B judges that at least one sign 58 has been detected (step S23: YES), then control proceeds to step S24.

In step S24, the output instructor 40 instructs the display unit 26 to output the sign information 72. In step S24, the ECU 22B operates in the same manner as in step S8 of the first embodiment (FIG. 5).

In step S25, the starting time determiner 134 confirms whether or not a trigger for instructing the display unit 26 to stop output of the sign information 72 should be produced. For example, the starting time determiner 134 may use turning-on of the blinker switch 21 (FIG. 1) by the driver of the vehicle 50 as a trigger. The reason for such a feature is that, by turning on the blinker switch 21, the driver expresses an intention to turn the vehicle 50 thereafter. If the starting time determiner 134 uses turning-on of the blinker switch 21 as a sole trigger, the display unit 26 is prevented from stopping output of sign information 72 while the vehicle 50 is being driven along a long curve.

Further, the starting time determiner 134 may use the detection of a directional change of the vehicle 50 as a trigger. Before the starting time determiner 134 judges whether or not a trigger should be produced, the directional change detector 132 detects whether the direction of travel of the vehicle 50 is changed, based on captured image signals that are successively acquired by the camera 12. For example, the direction of travel of the vehicle 50 is judged to have changed if the vehicle 50 moves across a lane marking on the road 56, or if an object (a sign 58 or a signal light) placed near the road 56 moves to the left or the right as viewed from the vehicle 50.

In step S26, based on the trigger produced in step S25, the starting time determiner 134 determines a starting time for a judgment process based on a measured amount. For example, the starting time determiner 134 determines, as the starting time, at least one of a time at which turning-on of the blinker switch 21 (FIG. 1) is received, and a time at which a directional change of the vehicle 50 is detected. In this manner, the judgment process, to be described later, can be started at an appropriate time.

In step S27, the measured amount acquirer 46 acquires, with a given sampling interval $\Delta t$, a measured amount, which is correlated to the behavior of the vehicle 50 in transverse directions thereof. The measured amount may comprise a time-dependent change of the steering angle or a yaw rate. In particular, the yaw rate is preferable as the measured amount, because the yaw rate, which serves as an output quantity, is correlated more closely to the actual behavior of the vehicle 50 than the time-dependent change of the steering angle, which serves as an input quantity. This tendency is manifested when the vehicle 50 is temporarily steered during a period when the vehicle 50 is skidding, for example.

In step S28, the output instructor 40 calculates a time integral (hereinafter referred to as an "integrated value I") of the measured amount that was acquired in step S27. The integrated value I corresponds to a value which is calculated by time-integrating the measured amount from the starting time (t=0) determined in step S26. The processor 30 temporarily stores the integrated value I as integrated value data 136 in the storage unit 32.

In step S29, the output instructor 40 judges whether or not the integrated value I calculated in step S28 satisfies a predetermined "output stop condition". The output stop condition is determined by the relationship between magnitudes of the absolute value (|I|) of the integrated value I and a preset first threshold value Ith1 (>0).

If the relationship |I|≤Ith1 is satisfied (step S29: YES), then in step S30, the output instructor 40 instructs the display unit 26 to display the output sign information 72. In response to the instruction, the display unit 26 newly displays in the display area 70 the sign information 72 concerning the type of sign 58.

If the relationship |I|≤Ith1 is not satisfied (step S29: NO), or stated otherwise, if the relationship |I|>Ith1 is satisfied, then in step S31, the output instructor 40 instructs the display unit 26 to stop output of the sign information 72. As a result, the sign information 72, which has been displayed in the display area 70, disappears.

In step S32, the output instructor 40 judges whether or not the judgment process should be continued based on the measured amount. For example, if in step S31, the output instructor 40 has not instructed the display unit 26 to stop output of the sign information 72, the output instructor 40 continues the judgment process (step S32: YES). Thereafter, control returns to step S27, and steps S27 through S31 are carried out successively.

If the output instructor 40 has instructed the display unit 26 to stop output of the sign information 72 in step S31, then the output instructor 40 finishes the judgment process (step S32: NO). Then, control returns to step S21. In this manner, by successively performing steps S21 through S32 shown in FIG. 11, the sign information output apparatus 10 outputs the sign information 72 while the vehicle 50 is being driven.

<First Specific Example of Output Process>

A first specific example of the output process will be described in detail below with reference to FIGS. 12 through 13B.

Figure 12:
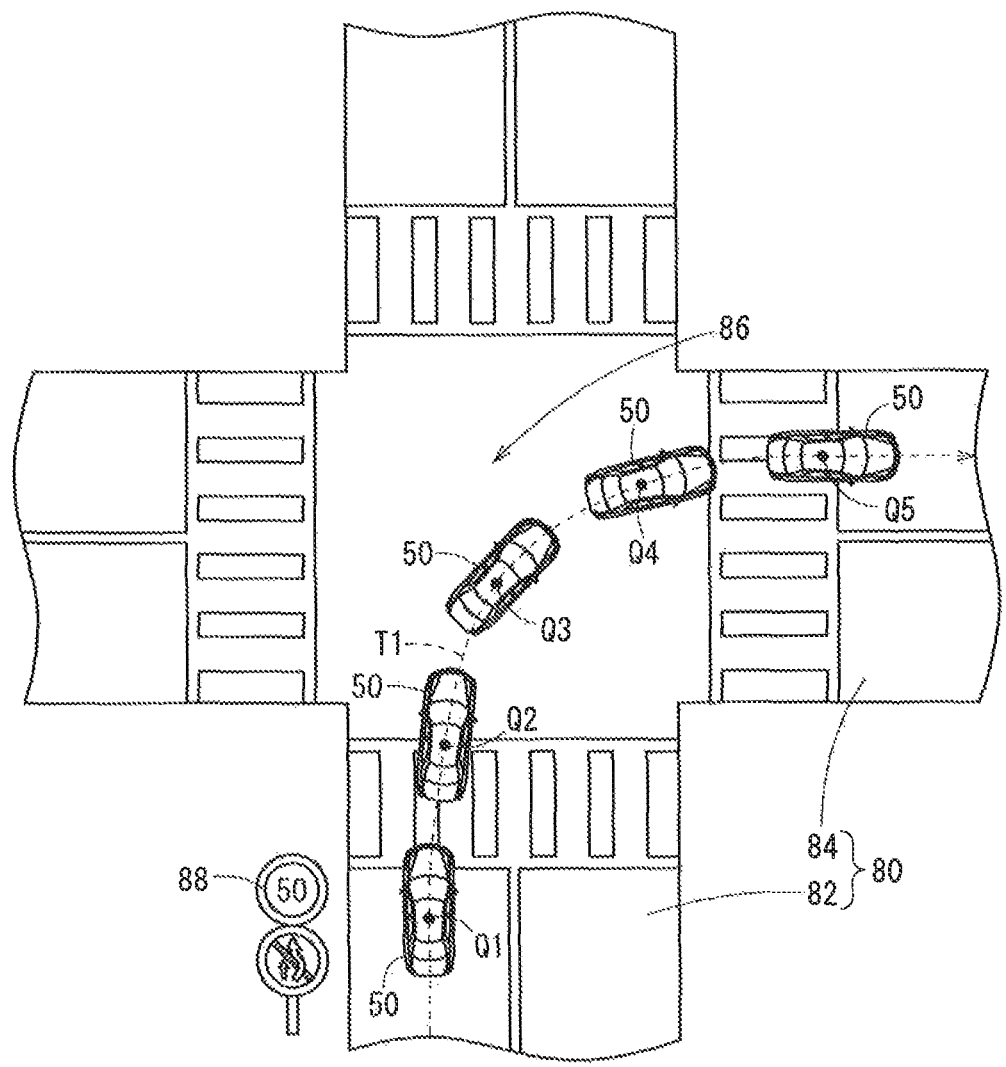
FIG. 12 is a plan view showing a first traveled path of a vehicle that is being driven through a crossroad.

FIG. 12 is a plan view showing a first traveled path T1 of the vehicle 50 that is being driven through a crossroad 80. The crossroad 80 is made up of a straight road 82, and a road 84 that runs across the road 82. A double sign 88 indicating "LIMIT SPEED 50 kph" and "NO PASSING" is placed short of an intersection 86 of the crossroad 80 on the left side of the crossroad 80.

The vehicle 50 travels along the first traveled path T1 successively through positions Q1 through Q5, and makes a right turn at the intersection 86. The driver of the vehicle 50 turns the steering wheel 64 (FIG. 2A) clockwise in a range from position Q1 to position Q3, and turns the steering wheel 64 counterclockwise in a range from position Q3 to position Q5.

Figure 13B:
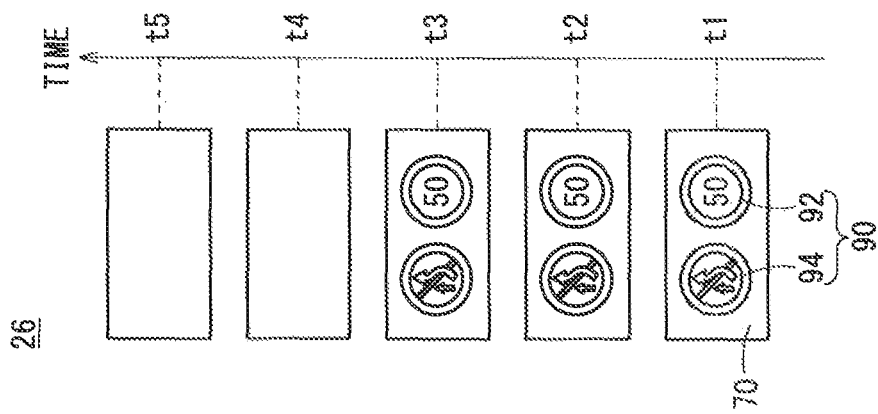
FIG. 13B is a diagram showing time-dependent changes of an output state of the display unit as the vehicle shown in FIG. 12 is being driven.
Figure 13A:
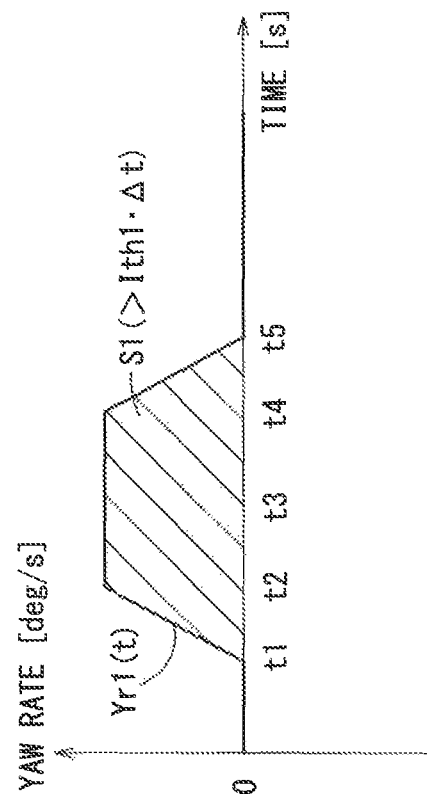
FIG. 13A is a graph showing time-dependent changes of a yaw rate, which are measured as the vehicle shown in FIG. 12 is being driven.

FIG. 13A is a graph showing time-dependent changes of a yaw rate, which are measured while the vehicle 50 shown in FIG. 12 is being driven. The graph has a horizontal axis representing elapsed time (unit: s, referred to simply as "time"), and a vertical axis representing the yaw rate (unit: deg/s). The yaw rate, which is represented by the vertical axis, is positive along a rightward transverse direction of the vehicle 50, i.e., along the direction in which the vehicle 50 makes a turn, and negative along a leftward transverse direction of the vehicle 50.

Times t1, t2, t3, t4, and t5 in FIG. 13A represent respective times at which the vehicle 50 has reached the positions Q1, Q2, Q3, Q4, and Q5 (FIG. 12). A measured time-dependent change of the yaw rate may occasionally be denoted by Yr1 (t).

Between time 0 and time t1, the yaw rate is generally indicated as Yr1(t)=0 because, as shown in FIG. 12, the vehicle 50 travels straight on the road 82 until the vehicle 50 reaches position Q1. In this case, the integrated value I generally is kept at I=0, and the relationship |I|≤Ith1 is satisfied.

Between time t1 and time t2, the yaw rate is indicated by Yr1(t)≥0, and the yaw rate increases monotonously as time elapses, because, as shown in FIG. 12, the vehicle 50 starts to turn to the right as the vehicle 50 is subjected to a clockwise steering action taken by the driver after the vehicle 50 has traveled through position Q1. In this case, the integrated value I increases monotonously over time. At time t2, the relationship |I|≤Ith1 remains satisfied.

Between time t2 and time t3, the yaw rate Yr1(t) is substantially constant, because, as shown in FIG. 12, the vehicle 50 continues to turn to the right as the steering wheel continues to be turned through the same steering angle after the vehicle 50 has traveled through position Q2.

Between time t3 and time t4, the yaw rate Yr1(t) remains substantially constant. In this case, it is assumed that an area S1, which is surrounded by the positive yaw rate Yr1(t) and the horizontal axis (time axis) of the graph shown in FIG. 13A, satisfies the relationship S1>Ith1·Δt (Δt: sampling interval). In this case, the relationship |I|>Ith1 is satisfied at least at time t4.

Between time t4 and time t5, the yaw rate is indicated by Yr1(t)≥0 and decreases monotonously over time, because the vehicle 50 continues to turn to the right, although the vehicle 50 is subjected to a counterclockwise steering action taken by the driver after the vehicle 50 has traveled through position Q4.

After time t5, the yaw rate is generally indicated by Yr1(t)=0, because, as shown in FIG. 12, the vehicle 50 travels straight on the road 84 after the vehicle 50 has reached position Q5 and has finished the clockwise turning motion thereof.

FIG. 13B is a diagram showing time-dependent changes of an output state of the display unit 26 as the vehicle 50 shown in FIG. 12 is being driven. In FIG. 13B, time passes from a lower side (t1) toward an upper side (t5).

At time t1, since the relationship |I|≤Ith1 is satisfied (step S29: YES in FIG. 11), the display unit 26 outputs sign information 90 with respect to the type of sign 88 in the display area 70 (step S30 of FIG. 11). The sign information 90 is made up of a first mark 92 representing "LIMIT SPEED 50 kph" and a second mark 94 representing "NO PASSING".

At times t2, t3, since the relationship |I|≤Ith1 remains satisfied (step S29: YES in FIG. 11) regardless of the increase in the integrated value I, the display unit 26 continues to output the sign information 90 in the display area 70 (step S30 of FIG. 11).

At time t4, since the integrated value I increases until the relationship |I|>Ith1 is satisfied (step S29: NO in FIG. 11), the sign information 90 displayed in the display area 70 disappears (step S31 of FIG. 11). At time t5, the display unit 26 continues to stop the sign information 90 from being output in the display area 70.

In this manner, the sign information output apparatus 10 performs an output process that is suitable for a right turn of the vehicle 50. The first specific example is not limited to a right turn of the vehicle 50, but may also be applied to various directional changes of the vehicle 50, including a left turn of the vehicle 50 and a U turn of the vehicle 50.

<Second Specific Example of Output Process>

A second specific example of the output process will be described in detail below with reference to FIGS. 14 through 15B.

Figure 14:
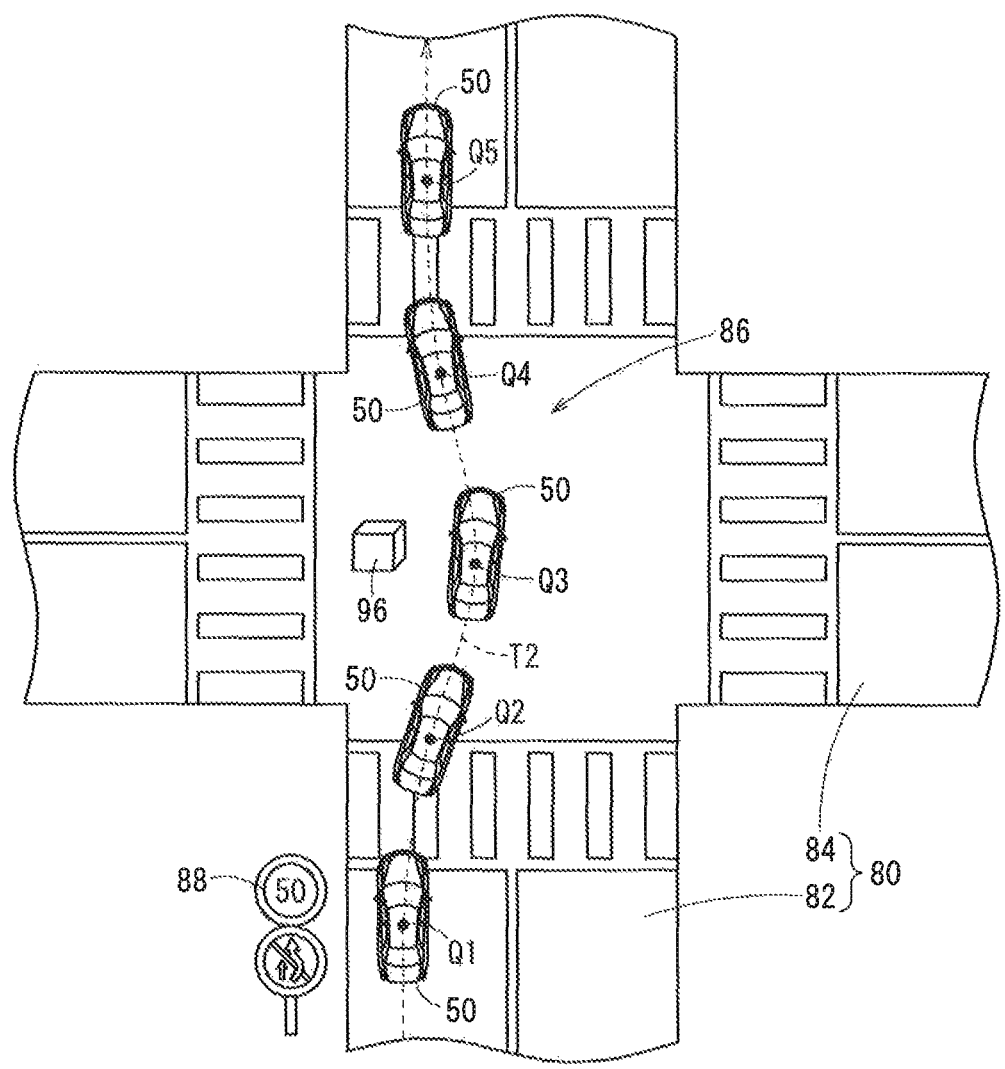
FIG. 14 is a plan view showing a second traveled path of a vehicle that is being driven through a crossroad.

FIG. 14 is a plan view showing a second traveled path T2 of the vehicle 50 that is being driven through a crossroad 80. The crossroad 80 is of the same configuration as the crossroad 80 shown in FIG. 12, and will not be described in detail below. In FIG. 14, an obstacle 96 of a relatively small size is present in the intersection 86. It is assumed that, when the vehicle 50 attempts to travel straight through the intersection 86, the vehicle 50 travels in such a manner so as to avoid colliding with the obstacle 96.

The vehicle 50 travels through the intersection 86 along the second traveled path T2 successively through positions Q1 through Q5. The driver of the vehicle 50 turns the steering wheel 64 (FIG. 2A) clockwise in a range from position Q1 to position Q3, and turns the steering wheel 64 counterclockwise in a range from position Q3 to position Q5.

Figure 15B:
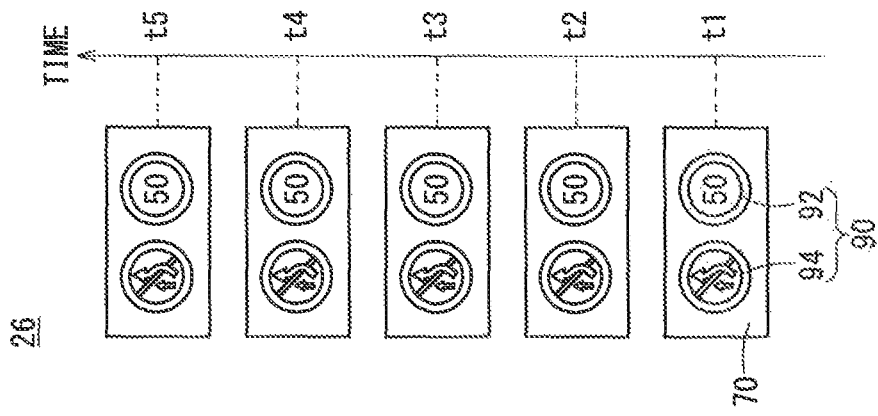
FIG. 15B is a diagram showing time-dependent changes of an output state of the display unit as the vehicle shown in FIG. 14 is being driven.
Figure 15A:
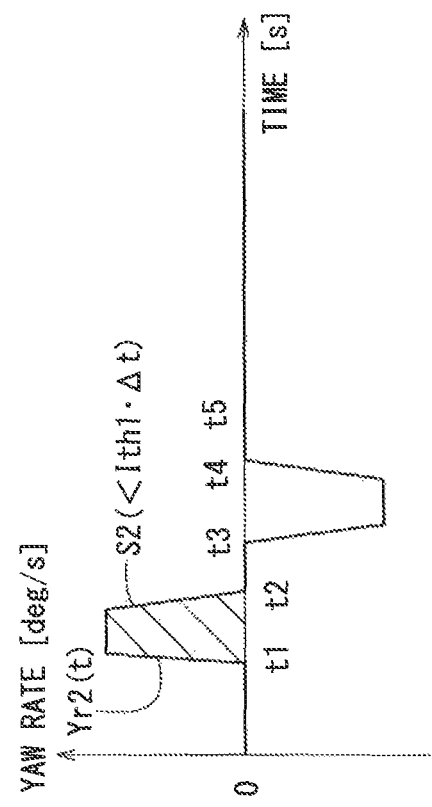
FIG. 15A is a graph showing time-dependent changes of a yaw rate that are measured as the vehicle shown in FIG. 14 is being driven.

FIG. 15A is a graph showing time-dependent changes of the yaw rate, which are measured while the vehicle 50 shown in FIG. 14 is being driven. The graph is defined in the same manner as the graph shown in FIG. 13A, and will not be described in detail below. A measured time-dependent change of the yaw rate may occasionally be denoted by Yr2(t).

Between time 0 and time t1, the yaw rate is generally indicated as Yr2(t)=0, because, as shown in FIG. 14, the vehicle 50 travels straight on the road 82 until the vehicle 50 reaches position Q1.

Between time t1 and time t3, the yaw rate is indicated by Yr2(t)≥0, because, as shown in FIG. 14, the vehicle 50 starts to depart from a straight course as the vehicle 50 is subjected to a clockwise steering action, which is taken by the driver to avoid the obstacle 96 after the vehicle 50 has traveled through position Q1. In this case, the integrated value I increases monotonously over time. It is assumed that an area S2, which is surrounded by the positive yaw rate Yr2(t) and the horizontal axis (time axis) of the graph shown in FIG. 15A, satisfies the relationship S2 <Ith1·Δt. In this case, the relationship |I|≤Ith1 is satisfied at time t3.

Between time t3 and time t5, the yaw rate is indicated by Yr2(t)<0, because the vehicle 50 starts to return to a straight course as the vehicle 50 is subjected to a counterclockwise steering action, which is taken by the driver after the vehicle 50 has traveled through position Q3.

After time t5, the yaw rate is generally indicated by Yr2(t)=0, because, as shown in FIG. 14, the vehicle 50 travels straight along the road 82 after the vehicle 50 has reached position Q5 and has finished the turning motion to avoid colliding with the obstacle 96.

FIG. 15B is a diagram showing time-dependent changes of an output state of the display unit 26 as the vehicle 50 shown in FIG. 14 is being driven. In FIG. 15B, time passes from a lower side (t1) toward an upper side (t5).

At time t1, since the relationship |I|≤Ith1 is satisfied (step S29: YES in FIG. 11), the display unit 26 outputs sign information 90 with respect to the type of sign 88 in the display area 70 (step S30 of FIG. 11).

At time t2, since the relationship |I|≤Ith1 is still satisfied (step S29: YES in FIG. 11) regardless of the increase in the integrated value I, the display unit 26 continues to output the sign information 90 in the display area 70 (step S30 of FIG. 11). Since |I| reaches a maximum value at this time, the sign information 90, which is displayed in the display area 70, does not disappear at least while the vehicle 50 is being driven through the intersection 86, as shown in FIG. 14.

In this manner, the sign information output apparatus 10 performs an output process that is suitable for a collision avoiding turn of the vehicle 50. The second specific example is not limited to a collision avoiding turn of the vehicle 50, but also may be applied to various temporary behavioral changes of the vehicle 50, including when the vehicle 50 executes a passing maneuver or a lane change.

<Third Specific Example of Output Process>

A third specific example of the output process will be described in detail below with reference to FIGS. 16 through 17B.

Figure 16:
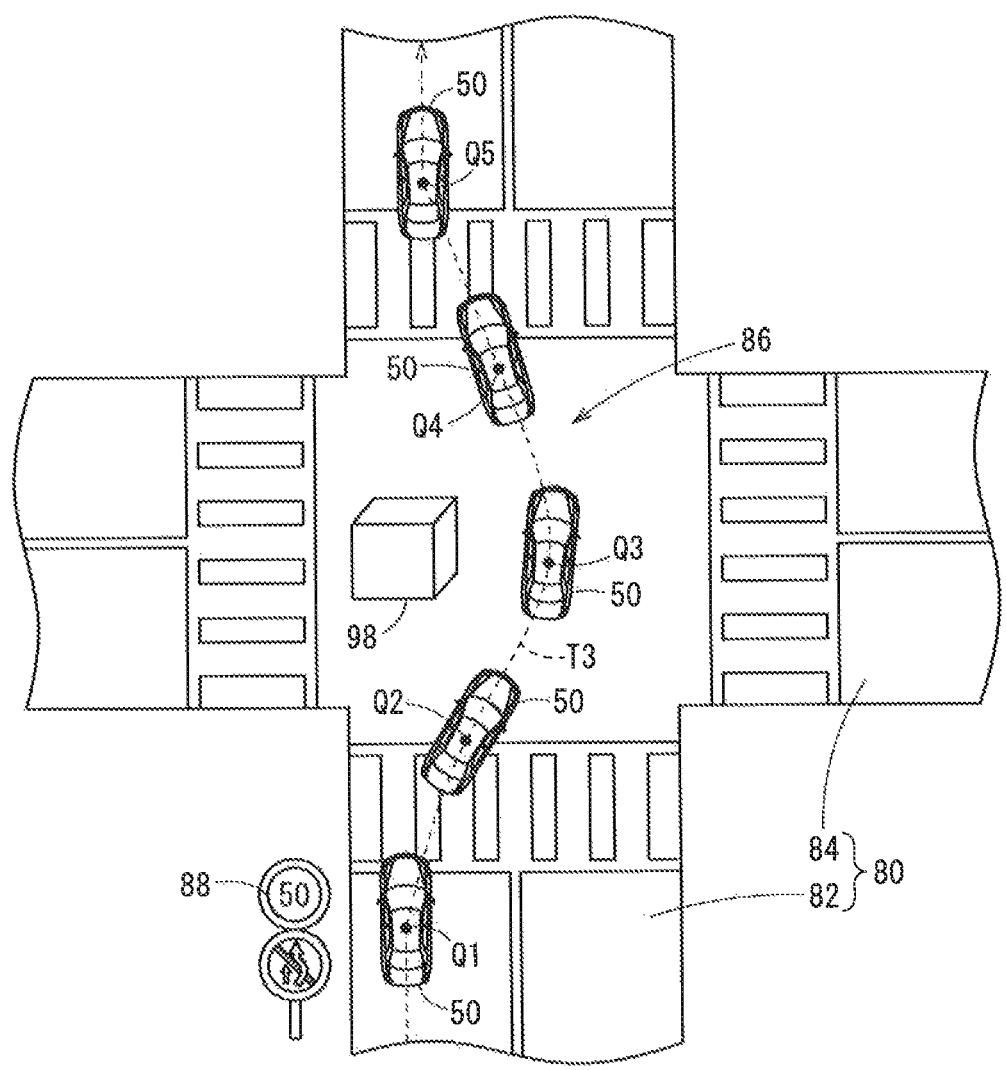
FIG. 16 is a plan view showing a third traveled path of a vehicle that is being driven through a crossroad.

FIG. 16 is a plan view showing a third traveled path T3 of the vehicle 50 that is being driven through a crossroad 80. The crossroad 80 is of the same configuration as the crossroads 80 shown in FIGS. 12 and 14, and will not be described in detail below. In FIG. 16, an obstacle 98 of a relatively large size is present in the intersection 86. It is assumed that when the vehicle 50 attempts to travel in a straight direction through the intersection 86, the vehicle 50 travels in such a manner so as to avoid colliding with the obstacle 98. It should be noted that, while avoiding the obstacle 98, the vehicle 50 is displaced transversely by a greater distance than the vehicle 50 in FIG. 14.

Figure 17B:
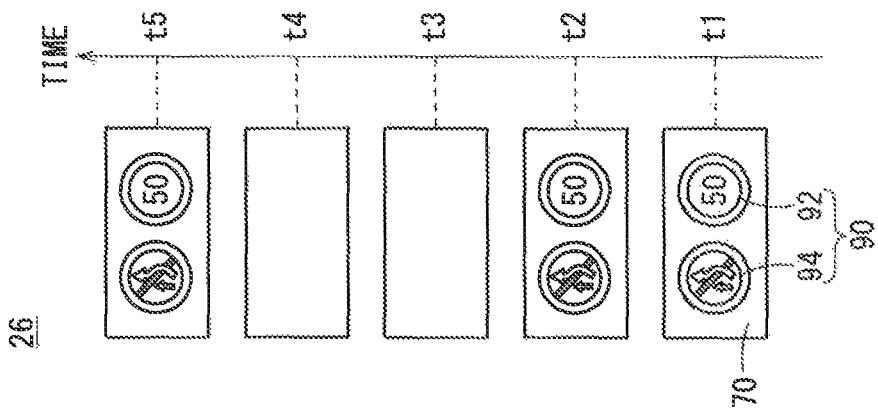
FIG. 17B is a diagram showing time-dependent changes of an output state of the display unit as the vehicle shown in FIG. 16 is being driven.
Figure 17A:
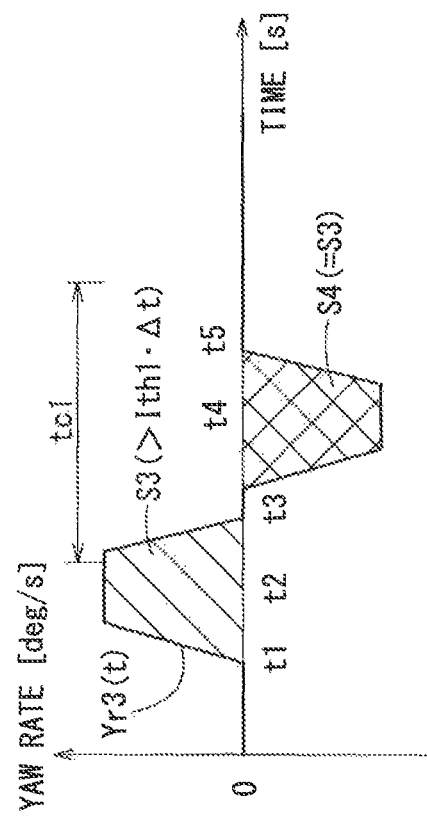
FIG. 17A is a graph showing time-dependent changes of a yaw rate that are measured as the vehicle shown in FIG. 16 is being driven.

FIG. 17A is a graph showing time-dependent changes of the yaw rate, which are measured while the vehicle 50 shown in FIG. 16 is being driven. The graph is defined in the same manner as the graphs shown in FIGS. 13A and 15A, and will not be described in detail below. The measured time-dependent change of the yaw rate may occasionally be denoted by Yr3(t).

Yr3(t) represents a time-dependent change of the yaw rate, which generally is similar to the yaw rate Yr2(t) shown in FIG. 15A. It is assumed that an area S3, which is surrounded by the positive yaw rate Yr3(t) and the horizontal axis (time axis) of the graph shown in FIG. 15A, satisfies the relationship S3>Ith1·Δt>S2. It also is assumed that an area S4, which is surrounded by the negative yaw rate Yr3(t) and the horizontal axis (time axis) of the graph shown in FIG. 15A, satisfies the relationship S3=S4.

At time t3, since the relationship |I|>Ith1 is satisfied (step S29: NO in FIG. 11), the sign information 90, which is displayed in the display area 70, disappears (step S31 of FIG. 11). Although after having traveled through position Q3, the vehicle 50 reaches the position Q5 and travels straight on the road 82, the display unit 26 continues to stop the sign information 90 from being output in the display area 70. In other words, the display unit 26 stops the sign information 90 from being output in the display area 70, because the vehicle 50 has traveled to avoid the obstacle 98 although the vehicle 50 is traveling along the same road 82. Such a feature is inconvenient for the driver of the vehicle 50.

Figure 11:
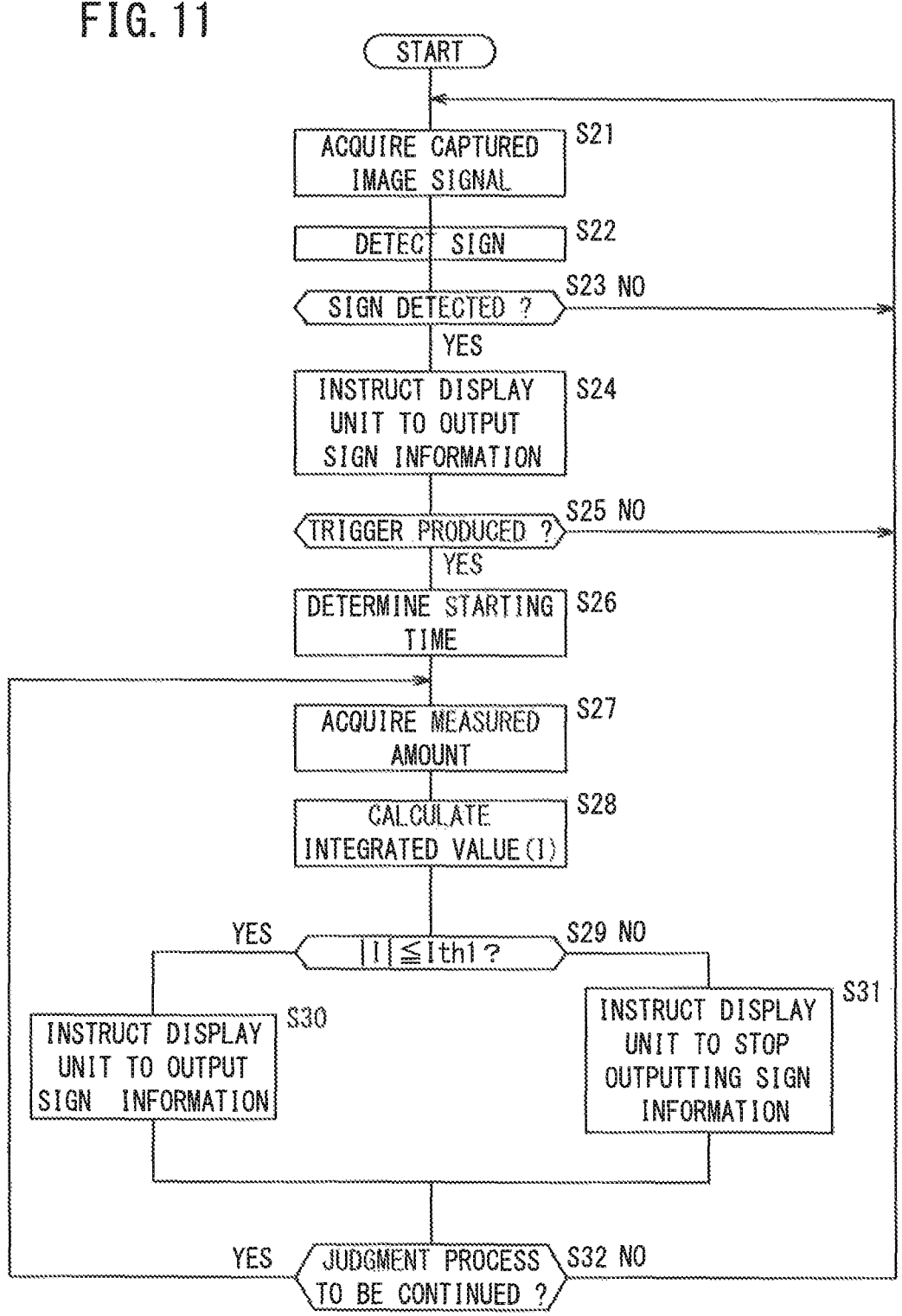
FIG. 11 is a flowchart of an operation sequence of the sign information output apparatus (the ECU shown in FIG. 10) according to the second embodiment.

In step S32 of FIG. 11, the output instructor 40 may continue the judgment process based on the measured amount, even after the output instructor 40 has instructed the display unit 26 to stop output of the sign information 72 in step S31 (step S32: YES). At this time, in step S27, the yaw rate sensor 16 further acquires the yaw rate (Yr3) after the output instructor 40 has instructed the display unit 26 to stop output of the sign information 72.

In step S29, the output instructor 40 judges whether or not the integrated value I calculated in step S28 satisfies a "re-output condition". The re-output condition is concerned with a relationship between magnitudes of the absolute value (|I|) of the integrated value I and a preset second threshold value Ith2. The second threshold value Ith2 is a positive value which is smaller than the first threshold value Ith1.

More specifically, if the relationship |I|<Ith2 is satisfied until a predetermined time (tc1) elapses after the instruction to stop output of the sign information 90, the output instructor 40 instructs the display unit 26 to re-output the sign information 90. Based on the instruction from the output instructor 40, the display unit 26 displays the sign information 72 with respect to the type of sign 88 in the display area 70.

As a result, as shown in FIG. 17B, the sign information 90, which has stopped being output temporarily at times t3 and t4, is re-output at time t5. In other words, even if the vehicle 50 reaches the position Q5 after having turned to avoid colliding with the obstacle 98, the sign information 90 concerning the sign 88 continues to be output.

In this manner, the output instructor 40 may instruct the information output section 48 to re-output the sign information 90, if the output instructor 40 judges that a time-dependent change of the measured amount satisfies the re-output condition. Since the sign information 90, whose output has been stopped after the vehicle 50 has moved to return to its previous course or direction of travel, is output again, the driver finds it convenient to see the sign information 90 again.

If the absolute value of the integrated value I from the starting time becomes smaller than the second threshold value Ith2 (<Ith1) until the predetermined time (tc1) elapses after the instruction to stop output of the sign information 90, the output instructor 40 may judge that the re-output condition is satisfied and instruct the display unit 26 to re-output the sign information 90. Thus, movement of the vehicle 50 to return to its previous course or direction of travel can be detected accurately.

[Improvement of the Output Process]

An improvement of the output process will be described in detail below with reference to FIGS. 18 through 22.

<State Transition>

Figure 18:
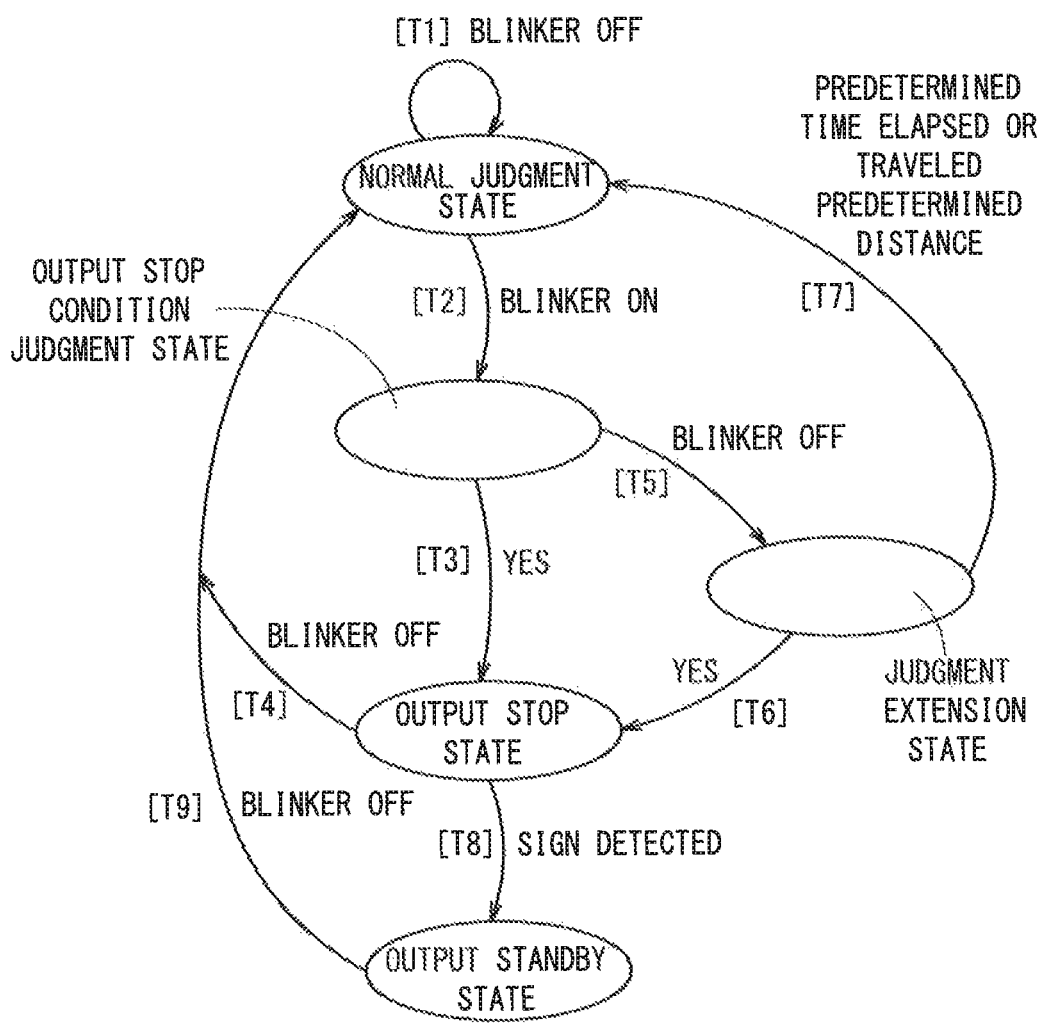
FIG. 18 is a state transition diagram illustrating operations of a processor shown in FIG. 10.

FIG. 18 is a state transition diagram illustrating operations of the processor 30 shown in FIG. 10. As shown in FIG. 18, the processor 30 can have any one of five states "NORMAL JUDGMENT", "OUTPUT STOP CONDITION JUDGMENT", "JUDGMENT EXTENSION", "OUTPUT STOP", and "OUTPUT STANDBY".

As indicated by the transition line "T1", until the blinker switch 21 (FIG. 1) is turned on, the processor 30 does not undergo a state transition, but remains in the state "NORMAL JUDGMENT". In this state, the processor 30 performs the normal judgment process, which was described above with reference to FIG. 11. If the blinker switch 21 is turned off, then the processor 30 transitions from the state "NORMAL JUDGMENT" to the state "OUTPUT STOP CONDITION JUDGMENT", as indicated by the transition line "T2". In the state "OUTPUT STOP CONDITION JUDGMENT", the processor 30 performs the judgment process described above with reference to steps S26 through S29 of FIG. 11.

If the output instructor 40 judges that the output stop condition (YES) is satisfied, as indicated by the transition line "T3", the processor 30 transitions from the state "OUTPUT STOP CONDITION JUDGMENT" to the state "OUTPUT STOP". In the state "OUTPUT STOP", the processor 30, particularly the output instructor 40, instructs the display unit 26 to stop output of the sign information 72, as described above with reference to step S31 of FIG. 11. Thereafter, if the blinker switch 21 is turned off, the processor 30 transitions from the state "OUTPUT STOP" to the state "NORMAL JUDGMENT", as indicated by the transition line "T4".

If the blinker switch 21 is turned off while the processor 30 is in the state "OUTPUT STOP CONDITION JUDGMENT", as indicated by the transition line "T5", the processor 30 transitions from the state "OUTPUT STOP CONDITION JUDGMENT" to the state "JUDGMENT EXTENSION". In the state "JUDGMENT EXTENSION", the processor 30 performs the same judgment process as in the state "OUTPUT STOP CONDITION JUDGMENT". In other words, if the output instructor 40 judges that the output stop condition (YES) is satisfied, the processor 30 transitions from the state "JUDGMENT EXTENSION" to the state "OUTPUT STOP", as indicated by the transition line "T6".

If a predetermined time elapses, or if the vehicle 50 travels a predetermined distance after the blinker switch 21 has been turned off and while the processor 30 is in the state "JUDGMENT EXTENSION", as indicated by the transition line "T7", then the processor 30 transitions from the state "JUDGMENT EXTENSION" to the state "NORMAL JUDGMENT".

If a sign 106 (FIG. 21) is detected while the processor 30 is in the state "OUTPUT STOP", as indicated by the transition line "T8", then the processor 30 transitions from the state "OUTPUT STOP" to the state "OUTPUT STANDBY". Thereafter, if the blinker switch 21 is turned off, the processor 30 transitions from the state "OUTPUT STANDBY" to the state "NORMAL JUDGMENT", as indicated by the transition line "T9".

<First Case Example>

Figure 19:
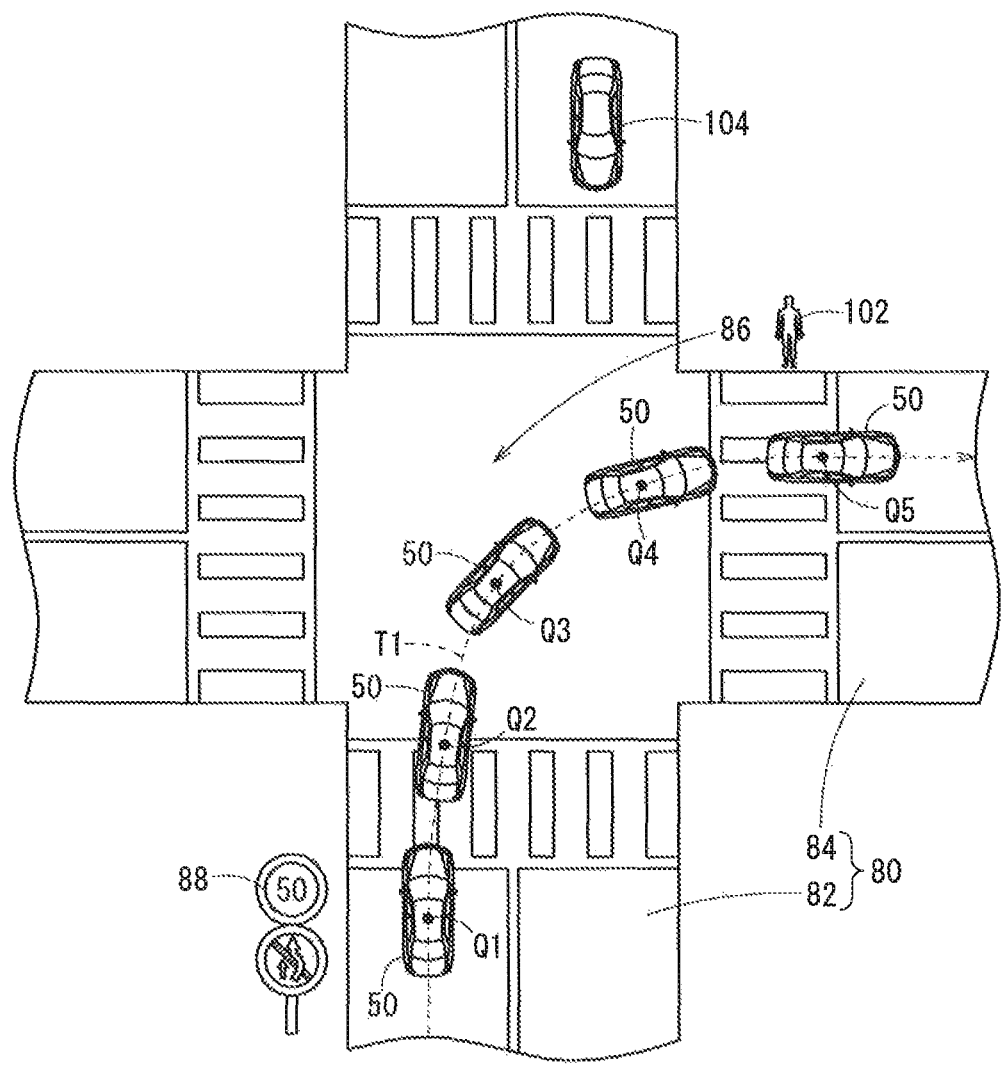
FIG. 19 is a plan view illustrating a first improved output process.

FIG. 19 is a plan view illustrating a first improved output process. As shown in FIG. 19, the vehicle 50 is driven through a crossroad 80. The crossroad 80 is of the same configuration as the crossroad 80 shown in FIG. 12, and will not be described in detail below. A pedestrian 102 is present near the traveled path T1, and an oncoming vehicle 104 is present on the road 82.

The vehicle 50 travels along the traveled path T1 successively through positions Q1 through Q5, and makes a right turn at the intersection 86. It is assumed that, while the vehicle 50 is making the right turn, the driver of the vehicle 50 recognizes the pedestrian 102 or the oncoming vehicle 104, and the driver temporarily stops the vehicle 50 at position Q3.

Figure 20A:
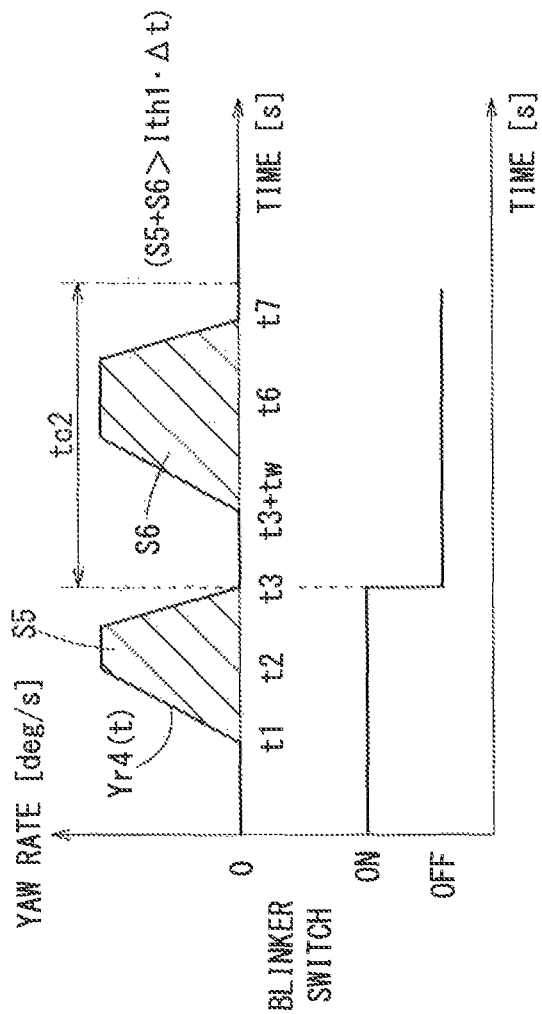
FIG. 20A is a graph showing time-dependent changes of a yaw rate that are measured as a vehicle shown in FIG. 19 is being driven.
Figure 20B:
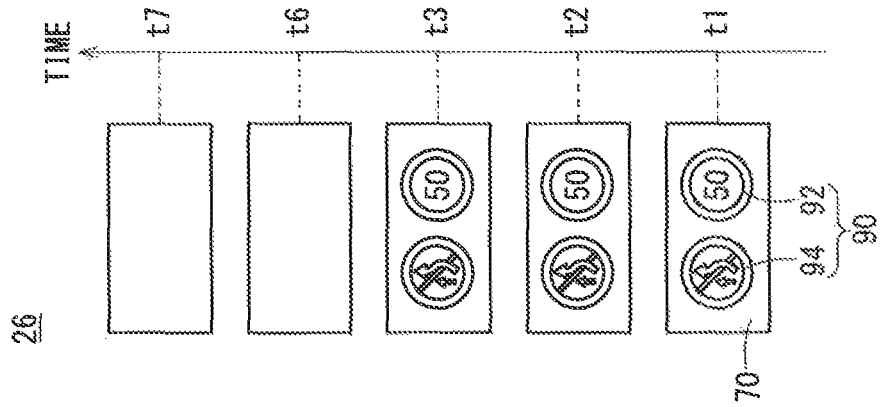
FIG. 20B is a diagram showing time-dependent changes of an output state of the display unit as the vehicle shown in FIG. 19 is being driven.

FIG. 20A is a graph showing time-dependent changes of a yaw rate, which are measured as the vehicle 50 shown in FIG. 19 is being driven. The graph is defined in the same manner as the graph shown in FIG. 13A, and will not be described in detail below. A measured time-dependent change of the yaw rate may occasionally be denoted by Yr4(t).

Times t1, t2, t3, t6, and t7 in FIG. 20A represent respective times at which the vehicle 50 has reached the positions Q1, Q2, Q3, Q4, and Q5 (FIG. 19). As can be seen from the graph shown in FIG. 20A, the vehicle 50 temporarily stops at time t3 (position Q3), and then resumes driving after a stopped time tw.

FIG. 20A also shows in a lower section thereof the manner in which the blinker switch 21 is turned on and off over time. It is assumed that at time t3, when the vehicle 50 stops, the blinker switch 21 is turned off.

According to the first improved output process, after the blinker switch 21 has been turned off, as indicated by the transition line "T5" in FIG. 18, the yaw rate sensor 16 further acquires the yaw rate (Yr4) until a predetermined time tc2 elapses. In this case, it is assumed that two areas S5, S6, which are surrounded by the positive yaw rate Yr4(t) and the horizontal axis (time axis) of the graph shown in FIG. 20A, satisfy the relationship $(S5+S6) > Ith1 \cdot \Delta t$.

Since the relationship $|I| \leq Ith1$ is satisfied at least between time 0 and time t3, the display unit 26 displays sign information 90 with respect to the type of sign 88 in the display area 70. At times t6 and t7, since the relationship $|I| > Ith1$ is satisfied, the display unit 26 stops output of the sign information 90 in the display area 70.

The yaw rate sensor 16 may acquire the yaw rate (Yr4) while the vehicle 50 is traveling over a predetermined distance, instead of until a predetermined time elapses. Stated otherwise, the yaw rate sensor 16 may be arranged to further acquire the yaw rate (Yr4) after the blinker switch 21 has been turned off, and until a predetermined time has elapsed and/or until the vehicle 50 has traveled over the predetermined distance.

The output instructor 40 may instruct the display unit 26 to stop output of the sign information 72, if a time-dependent change of the measured amount (the yaw rate), except for a time period during which the vehicle 50 is stopping, satisfies the output stop condition. Since the time period in which the vehicle 50 is stopping is excluded, the accuracy of the judgment process based on a time-dependent change of the measured amount is increased.

While the vehicle 50 is stopping, the vehicle 50 may be in a full stop condition or the vehicle 50 may be substantially stopping, e.g., creeping at a very low speed of about 3 kph, for example. The time period referred to above may be excluded from a predetermined time of 2 seconds, for example, or may be excluded by excluding a count up to a predetermined time.

<Second Case Example>

Figure 21:
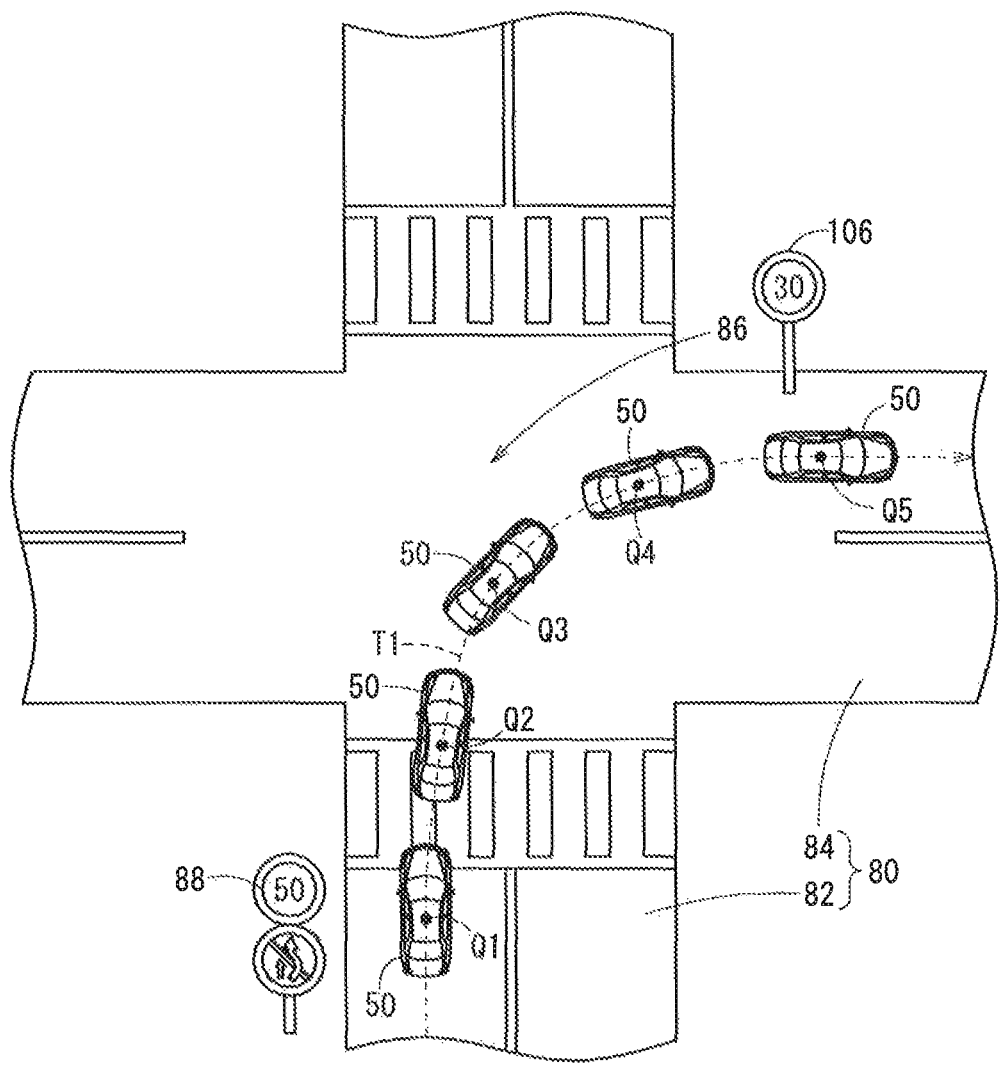
FIG. 21 is a plan view illustrating a second improved output process.

FIG. 21 is a plan view illustrating a second improved output process. As shown in FIG. 21, the vehicle 50 is driven through a crossroad 80. The crossroad 80 is of the same configuration as the crossroad 80 shown in FIG. 12, and thus will not be described in detail below. A sign 106, which is a different type of sign from the sign 88, is placed on the road 84. The sign 106 indicates that the road 84 has a speed limit of 30 [kph].

The vehicle 50 travels along the traveled path T1 successively through positions Q1 through Q5, and makes a right turn in the intersection 86. It is assumed that when the vehicle 50 reaches point Q3, the sign detector 34 is capable of detecting the presence and type of the sign 106 for the first time. According to the output process described above, when the vehicle 50 reaches point Q3, the output instructor 40 outputs sign information with respect to the type of sign 106.

However, if the relationship |I|>Ith1 is satisfied up to the point at which the vehicle 50 reaches position Q5, then a disadvantage occurs in that the sign information 108 (see FIG. 22), which should continue to be output, disappears.

According to the second improved output process, under a predetermined condition (i.e., the transition line "T8" shown in FIG. 18), the output instructor 40 outputs sign information 108 with respect to another type of sign 106, after the directional change detector 132 has detected completion of a directional change. The predetermined condition is satisfied if the sign detector 34 detects a sign 106 other than the most recently detected sign 88, which has been detected before while the vehicle 50 is making a directional change, i.e., while the direction of travel of the vehicle is changing.

Figure 22:
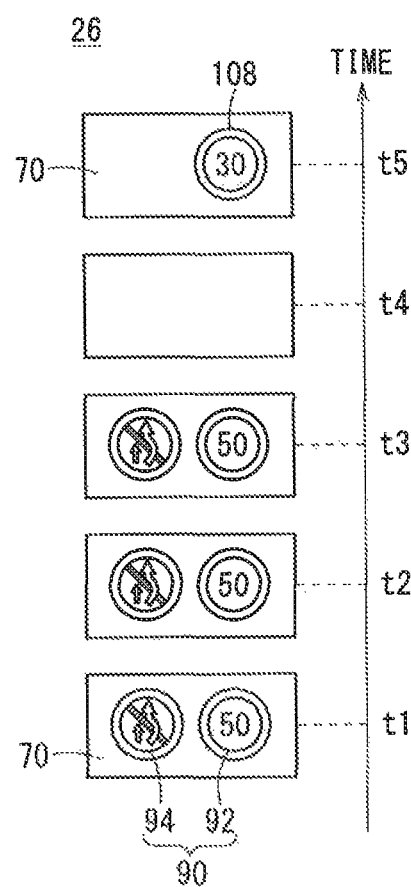
FIG. 22 is a diagram showing time-dependent changes of an output state of the display unit as a vehicle shown in FIG. 21 is being driven.

FIG. 22 is a diagram showing time-dependent changes of an output state of the display unit 26 as the vehicle 50 shown in FIG. 21 is being driven. Between time t1 and time t3, the display unit 26 displays in the display area 70 sign information 90 with respect to the type of sign 88, in a similar manner as the time-dependent changes shown in FIG. 13B.

At time t3, although the sign 106 has been newly detected, the sign information 90 continues to be output in the display area 70. At time t4, the sign information 90, which has been displayed in the display area 70, disappears. At time t5, a termination of the directional change of the vehicle 50 is detected, and the sign information 108 is displayed in the display area 70. Consequently, the sign information 108, having been output once, is prevented from not being output erroneously until completion of the directional change of the vehicle 50. This feature enhances convenience for the driver of the vehicle 50.

<Advantages of the Second Embodiment>

As described above, the sign information output apparatus 10 according to the second embodiment includes the camera 12, which is mounted on the vehicle 50 for capturing an image and acquiring a captured image signal representing the captured image while the vehicle 50 is being driven, the sign detector 34 for detecting the sign 58, 88, 106 from an image area represented by the captured image signal, the information output section 48 for outputting the sign information 72, 90, 108 with respect to the type of sign 58, 88, 106, the measured amount acquirer 46 for acquiring a measured amount correlated to a behavior of the vehicle 50 in transverse directions thereof, the starting time determiner 134 for determining a starting time of a judgment process based on the measured amount, and the output instructor 40 for instructing the information output section 48 to stop output of the sign information 72, 90, 108 if a time-dependent change of the measured amount from the starting time satisfies an output stop condition.

The sign information output apparatus 10, which is arranged in the foregoing manner, is capable of appropriately judging whether or not output of the sign information 72, etc., should be stopped, based on a time-dependent change of the behavior of the vehicle 50 in transverse directions thereof. Therefore, it is possible to stop output of the sign information 72, etc., without being affected by temporary behaviors of the vehicle 50.

[Third Embodiment]

A sign information output apparatus 10 incorporating an ECU 22C (one form of the ECU 22) according to a third embodiment of the present invention will be described below with reference to FIG. 23.

<Configuration of ECU 22C>

Figure 23:
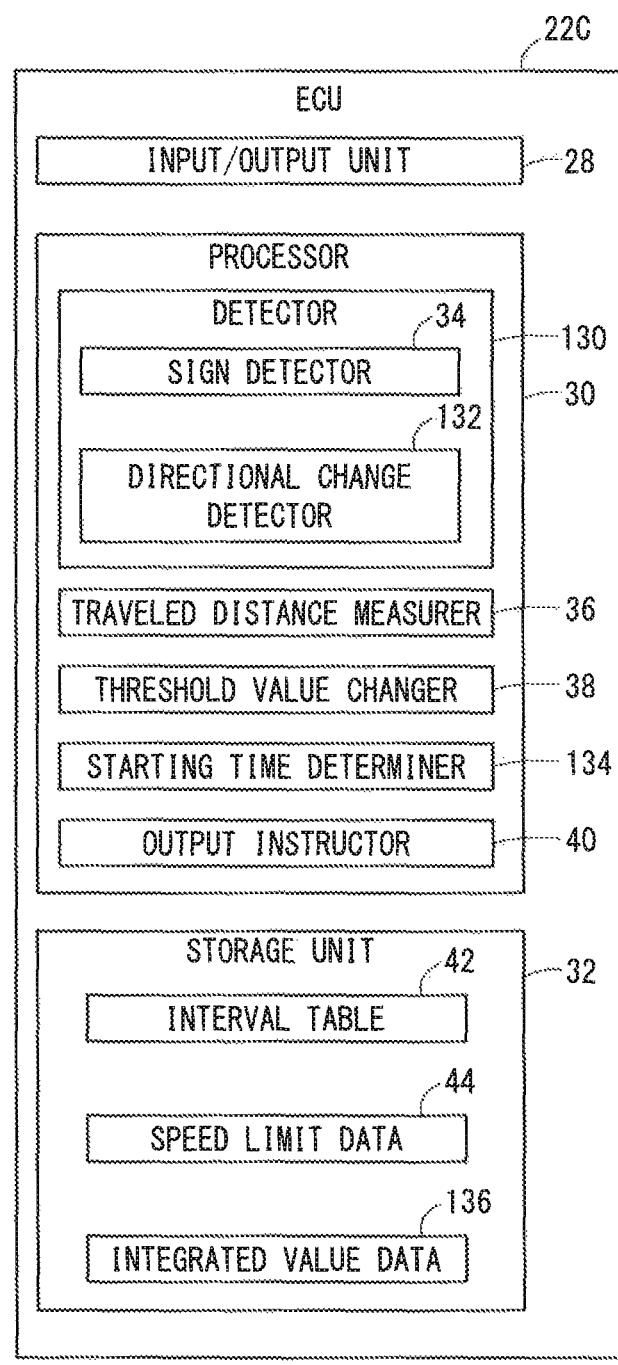
FIG. 23 is a detailed block diagram of an ECU according to a third embodiment of the present invention.

FIG. 23 is a detailed block diagram of an ECU 22C according to a third embodiment of the present invention.

The ECU 22C includes a processor 30, which functions as a sign detector 34, a traveled distance measurer 36, a threshold value changer 38, and an output instructor 40. The ECU 22C also includes a storage unit 32, which stores an interval table 42 and speed limit data 44. The processor 30, which is arranged in the foregoing manner, is capable of performing the output processes according to the first and second embodiments in combination with each other.

[Supplementary Notes]

The present invention is not limited to the above embodiments. The embodiments may be changed or modified without departing from the scope of the present invention.

In the above embodiments, the output process is performed on a captured image signal, which is acquired by a monocular camera 12. However, the output process may be performed on a captured image signal, which is acquired by a multi-lens camera (stereo camera).

In FIGS. 2B, 9, 13B, etc., the sign information 72, etc., is output temporarily in a fixed fashion. However, the sign information 72, etc., may be modified, e.g., faded out, over time.

What is claimed is:

1. A sign display apparatus comprising:
    an image capturing unit mounted on a vehicle configured to capture an image and acquire a captured image signal representing the captured image while the vehicle is being driven;
    a sign detector configured to detect a sign on a peripheral edge of a road from an image area represented by the captured image signal acquired by the image capturing unit;
    an information output section configured to output sign information with respect to a type of the sign that is detected by the sign detector;
    a traveled distance measurer configured to measure a traveled distance over which the vehicle has traveled, in response to detection of the sign;
    an output instructor configured to instruct the information output section to stop output of the sign information if the traveled distance measured by the traveled distance measurer exceeds a threshold value;
    a table configured to store a plurality of values related to intervals between the signs; and
    a threshold value changer configured to change the threshold value based on an average of the stored values,
    wherein the table stores as the stored values the intervals between the signs indicative of a same speed limit based on the traveled distance measured by the traveled distance measurer.

2. The sign display apparatus according to claim 1, further comprising:
    a storage unit configured to successively store measured traveled distances;
    wherein the threshold value changer changes the threshold value according to a learning process that uses a plurality of most recently stored traveled distances stored in the storage unit as inputs, and uses the threshold value as an output.

3. The sign display apparatus according to claim 2, wherein the storage unit does not store the traveled distance if numerical values of speed limits represented by two adjacent signs differ from each other.

4. The sign display apparatus according to claim 2, wherein the storage unit does not store the traveled distance if the vehicle changes a direction of travel while the traveled distance is being measured.

5. A sign display apparatus comprising:
an image capturing unit mounted on a vehicle configured to capture an image and acquire a captured image signal representing the captured image while the vehicle is being driven;
a sign detector configured to detect a sign from an image area represented by the captured image signal acquired by the image capturing unit;
an information output section configured to output sign information with respect to a type of the sign that is detected by the sign detector;
a measured amount acquirer configured to acquire a yaw rate or a time-dependent change of a steering angle of the vehicle as a measured amount that is correlated to a steering amount for moving the vehicle in transverse directions thereof;
a starting time determiner configured to determine a starting time of a judgment process based on the measured amount acquired by the measured amount acquirer; and
an output instructor configured to instruct the information output section to stop output of the sign information if the time-dependent change of the measured amount from the starting time determined by the starting time determiner is judged to satisfy an output stop condition,
wherein the output instructor instructs the information output section to stop output of the sign information if the absolute value of a time integral of the measured amount, except for a time period in which the vehicle is stopping, satisfies the output stop condition,
wherein the output instructor judges that the time-dependent change of the measured amount satisfies the output stop condition, if an absolute value of a time integral of the measured amount exceeds a first threshold value, and
wherein the time dependent change of opposite steering direction are cancelled out in the absolute value of a time integral of the measured amount.

6. The sign display apparatus according to claim 5, wherein the measured amount acquirer further acquires the measured amount after the output instructor instructs the information output section to stop output of the sign information; and
the output instructor instructs the information output section to re-output the sign information, if the time-dependent change of the measured amount is judged to satisfy a re-output condition.

7. The sign display apparatus according to claim 5, wherein if the absolute value of the time integral of the measured amount from the staring time becomes smaller than a second threshold value, which is smaller than the first threshold value, a direction of travel is temporarily changed, and the output instructor instructs the information output section to re-output the sign information by judging that the time-dependent change of the measured amount satisfies the re-output condition.

8. The sign display apparatus according to claim 5, further comprising:
a directional change detector configured to detect whether or not a direction of travel of the vehicle has changed, based on captured image signals that are successively acquired by the image capturing unit;
wherein the starting time determiner determines as the starting time a time at which the directional change detector detects that the direction of travel of the vehicle starts to change.

9. The sign display apparatus according to claim 1, further comprising:
a measured amount acquirer configured to acquire a measured amount that is correlated to a behavior of the vehicle in transverse directions thereof; and
a starting time determiner configured to determine a starting time of a judgment process based on the measured amounts acquired by the measured amount acquirer;
wherein the output instructor instructs the information output section to stop output of the sign information if a time-dependent change of the measured amount from the starting time determined by the starting time determiner satisfies an output stop condition.

10. The sign display apparatus according to claim 9, wherein the output instructor instructs the information output section to stop output of the sign information by judging that the time-dependent change of the measured amount satisfies the output stop condition, if an absolute value of a time integral of the measured amount exceeds a first threshold value.

11. The sign display apparatus according to claim 10, wherein the measured amount acquirer acquires as the measured amount a time-dependent change of a steering angle or a yaw rate of the vehicle.

12. The sign display apparatus according to claim 10, wherein the measured amount acquirer further acquires a measured result after the output instructor has instructed the information output section to stop output of the sign information; and
the output instructor instructs the information output section to re-output the sign information, if the time-dependent change of the measured amount is judged to satisfy a re-output condition.

13. The sign display apparatus according to claim 12, wherein the output instructor instructs the information output section to re-output the sign information by judging that the time-dependent change of the measured amount satisfies the re-output condition, if the absolute value of the time integral of the measured amount from the starting time becomes smaller than a second threshold value, which is smaller than the first threshold value, until a predetermined time elapses after the output instructor has instructed the information output section to stop output of the sign information.

14. The sign display apparatus according to claim 9, wherein the starting time determiner determines as the starting time a time at which a blinker switch of the vehicle is turned on.

15. The sign display apparatus according to claim 14, wherein the measured amount acquirer further acquires a measured amount after the blinker switch has been turned off, until a predetermined time elapses and/or the vehicle travels a predetermined distance.

16. The sign display apparatus according to claim 15, wherein the output instructor instructs the information output section to stop output of the sign information if the time-dependent change of the measured amount, except for a time period in which the vehicle is stopping, satisfies the output stop condition.

17. The sign display apparatus according to claim 9, further comprising:
a directional change detector configured to detect whether or not a direction of travel of the vehicle has changed, based on captured image signals that are successively acquired by the image capturing unit;

wherein the starting time determiner determines as the starting time a time at which the directional change detector detects that the direction of travel of the vehicle starts to change.

18. The sign display apparatus according to claim 17, wherein if the sign detector newly detects a sign, other than the sign that has been most recently detected while the vehicle is making a directional change, the output instructor outputs the sign information with respect to a type of the other sign, after the directional change detector has detected completion of the directional change.

19. The sign display apparatus according to claim 1, wherein the interval information is provided by a storage unit configured to store the traveled distance measured by the traveled distance measurer and an interval table for renewing the interval information based on the traveled distance stored in the storage unit.

20. The sign display apparatus according to claim 5, wherein if the absolute value of the time integral of the measured amount exceeds the first threshold value, the output instructor is configured to judge that the vehicle has changed a direction of travel, and continue to stop the output of the sign information.

* * * * *